United States Patent [19]

Kalthoff et al.

[11] 4,327,834
[45] May 4, 1982

[54] DOCUMENT RETRIEVAL SYSTEM

[75] Inventors: Robert J. Kalthoff, Cincinnati; Paul J. Neumeier, Loveland, both of Ohio

[73] Assignee: O. K. Partnership, Cincinnati, Ohio

[21] Appl. No.: 174,458

[22] Filed: Aug. 1, 1980

[51] Int. Cl.³ .............................................. B07C 5/36
[52] U.S. Cl. .................... 209/609; 209/610; 209/636; 209/942; 209/909; 414/134
[58] Field of Search ............... 209/609, 610, 636, 909, 209/942; 235/92 SB, 425; 414/134, 135, 136; 198/347, 366

[56] References Cited

U.S. PATENT DOCUMENTS

| | | | |
|---|---|---|---|
| Re. 27,762 | 9/1973 | Parry et al. | 209/609 |
| 3,450,261 | 6/1969 | Kalthoff et al. | |
| 3,610,413 | 10/1971 | Bandenburg | 209/609 |
| 3,616,902 | 11/1971 | Parry | |
| 3,630,354 | 12/1971 | O'Brien | |
| 3,709,382 | 1/1973 | Morris | 414/134 |
| 3,726,400 | 4/1973 | Kalthoff et al. | |
| 3,786,916 | 1/1974 | O'Brien | |
| 3,789,982 | 2/1974 | Russell | 209/609 |
| 3,853,224 | 12/1974 | Furuoka et al. | 209/609 |
| 3,866,755 | 2/1975 | Yanagawa | 209/609 |
| 4,076,125 | 2/1978 | Ohsaki et al. | 209/609 |

Primary Examiner—Allen N. Knowles
Attorney, Agent, or Firm—Wood, Herron & Evans

[57] ABSTRACT

Apparatus for (a) selecting plural desired edge-notched coded documents from different decks of similarly coded documents successively delivered to a document selector from a remote mass document store, in which selection process the selected documents extend only partially out of their respective decks in a direction parallel to their code-notched edge, and (b) successively fully removing the partially extending documents selected from the various successively retrieved decks and temporarily storing them in a temporary storage zone prior to ejecting them into a stationary container in which they are accumulated for manual removal at the convenience of an operator. Also included is a movable selected document removal and temporary storage assembly which traverses along a path adjacent the document selector proximate the leading edges of documents selected from the deck thereat. The traversing assembly is provided with means for successively removing from the deck selected documents extending into its traversing path at different points therealong and temporarily storing the selected cards so removed in a temporary storage zone incorporated in the traversing assembly. The traversing assembly further includes a document ejecting assembly which, when the traversing assembly is in its home position clear of the document selector following traversal of each deck, is effective to eject selected documents located in the temporary storage zone thereof into a stationary container adjacent the home position for accumulation and subsequent manual removal by an operator.

23 Claims, 22 Drawing Figures

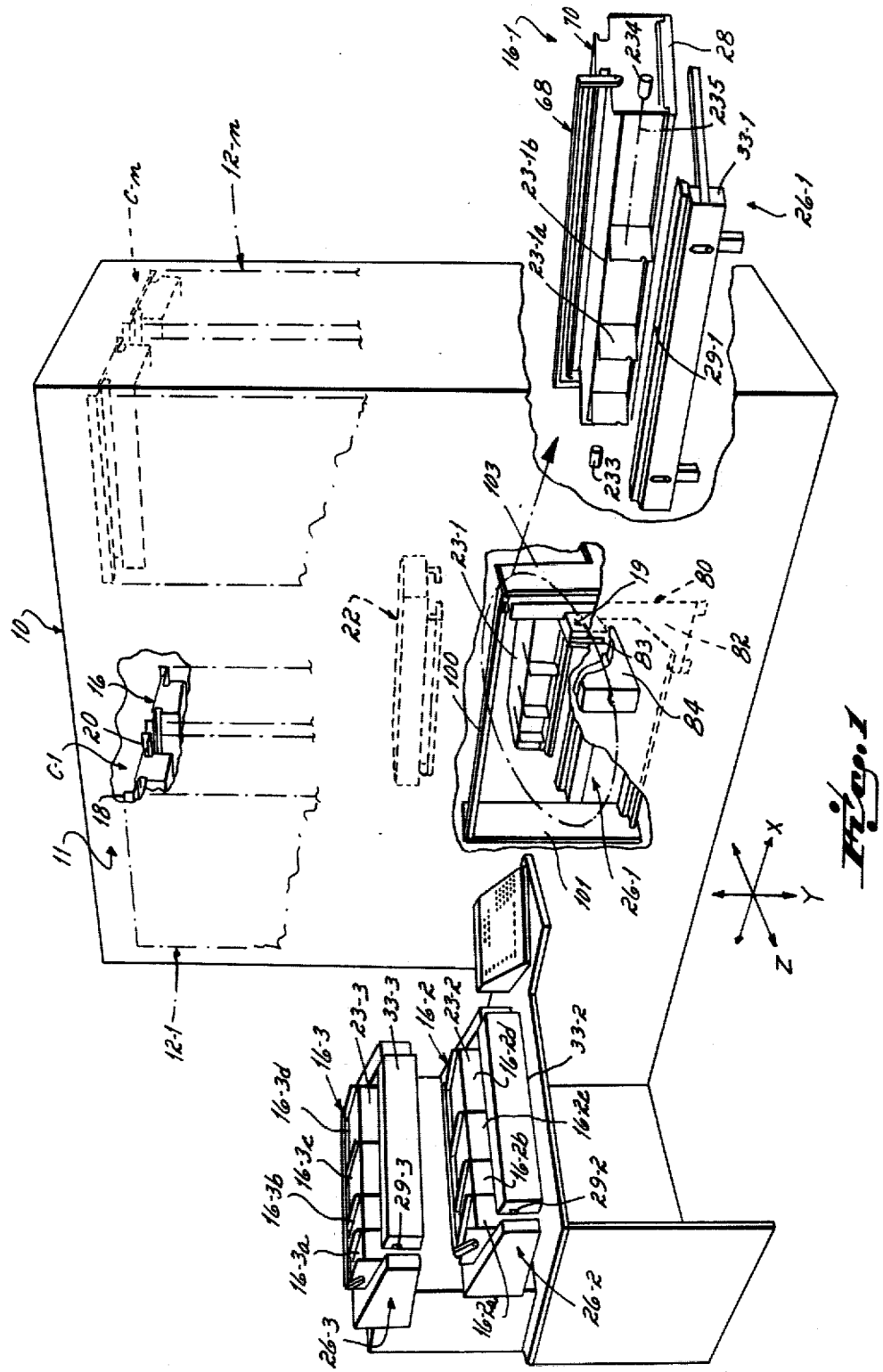

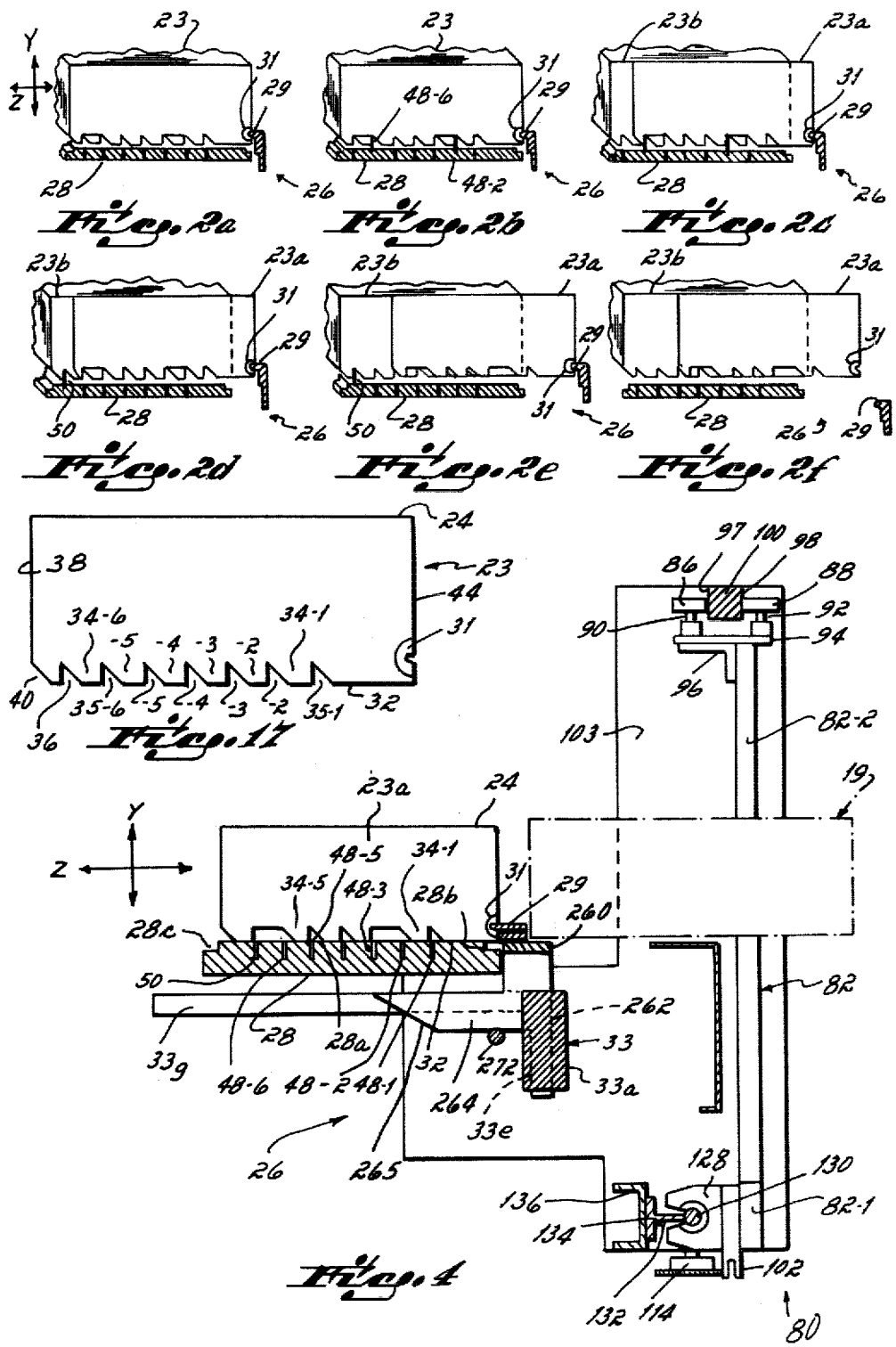

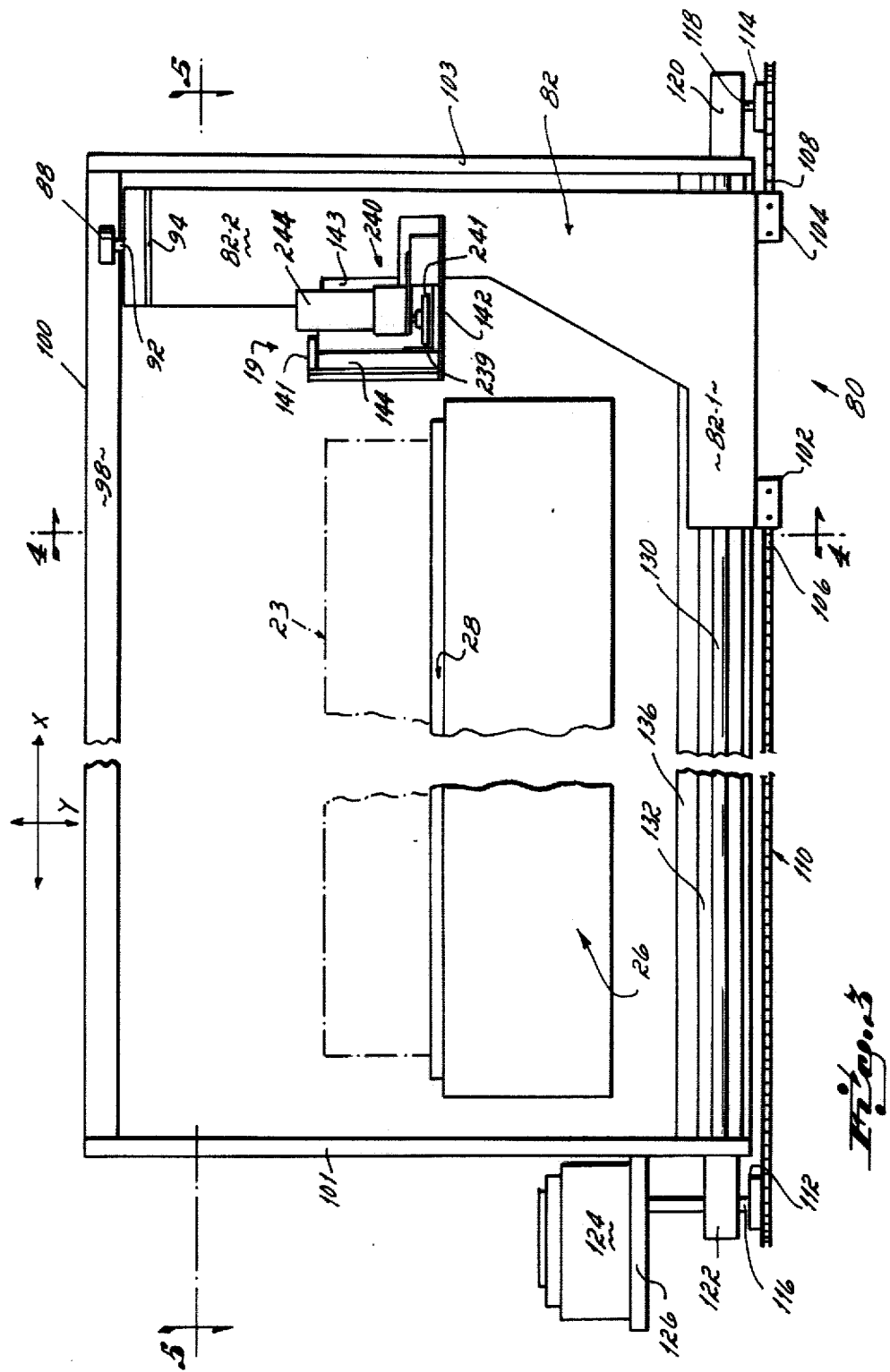

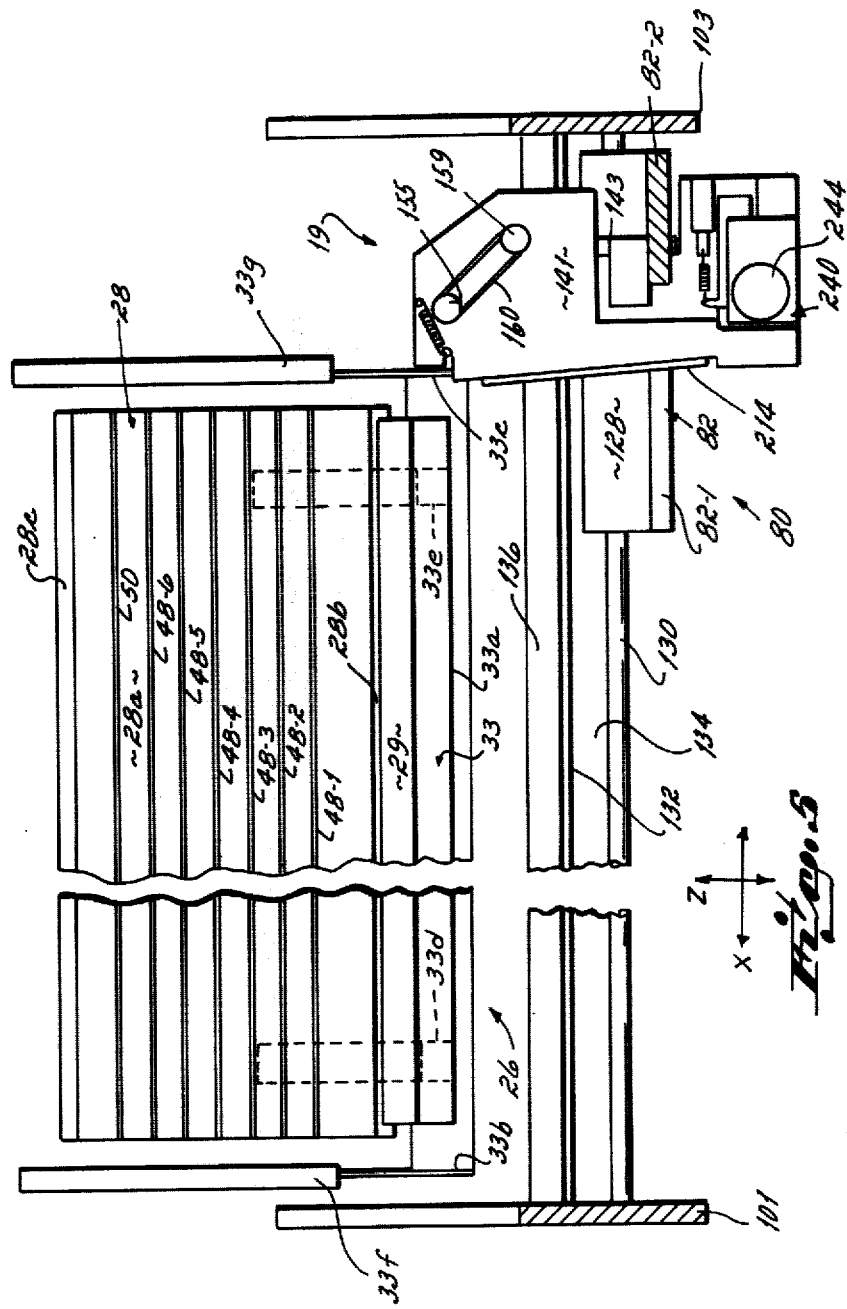

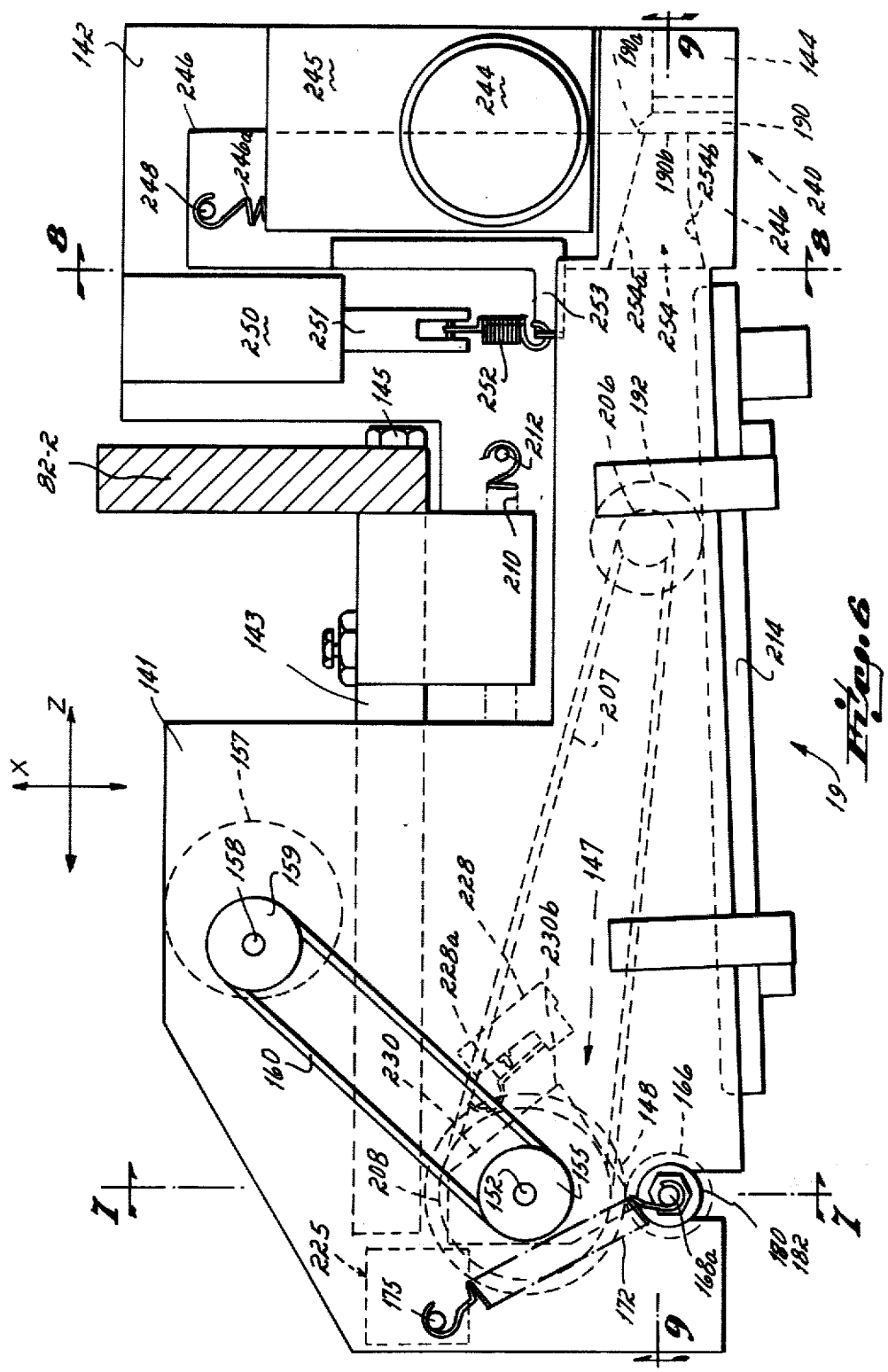

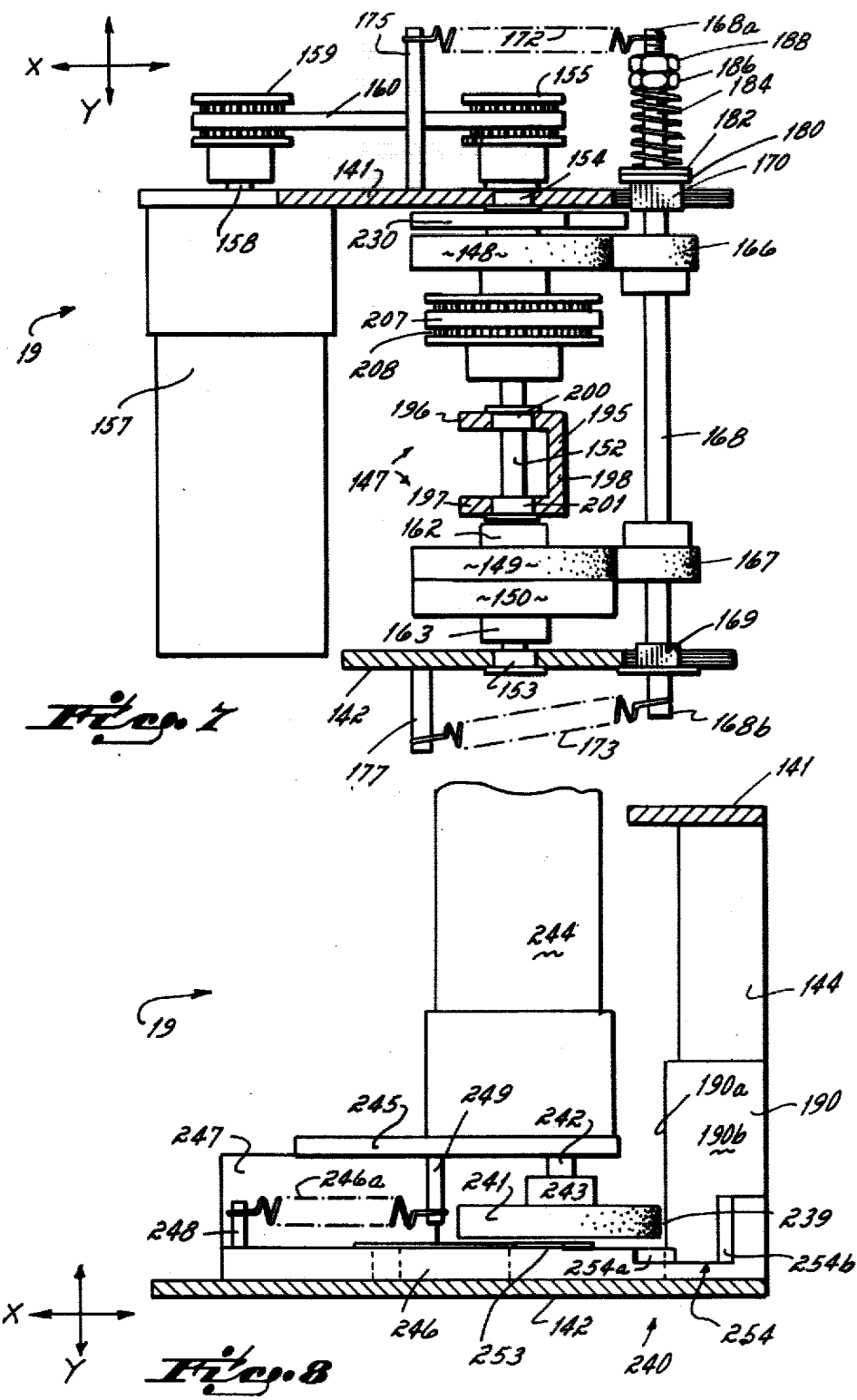

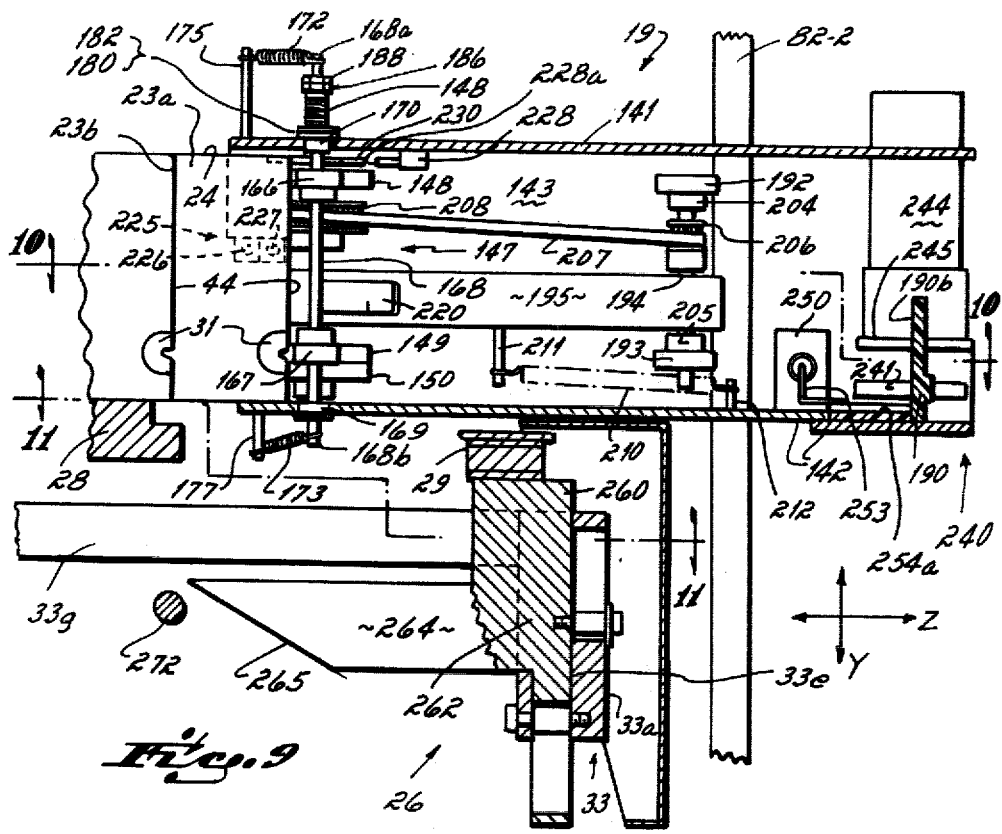
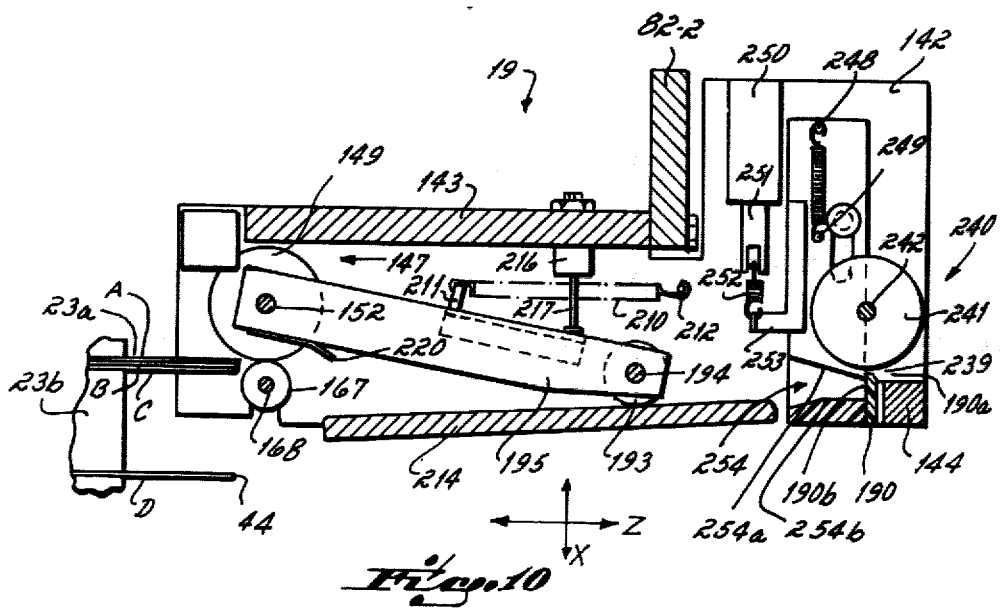

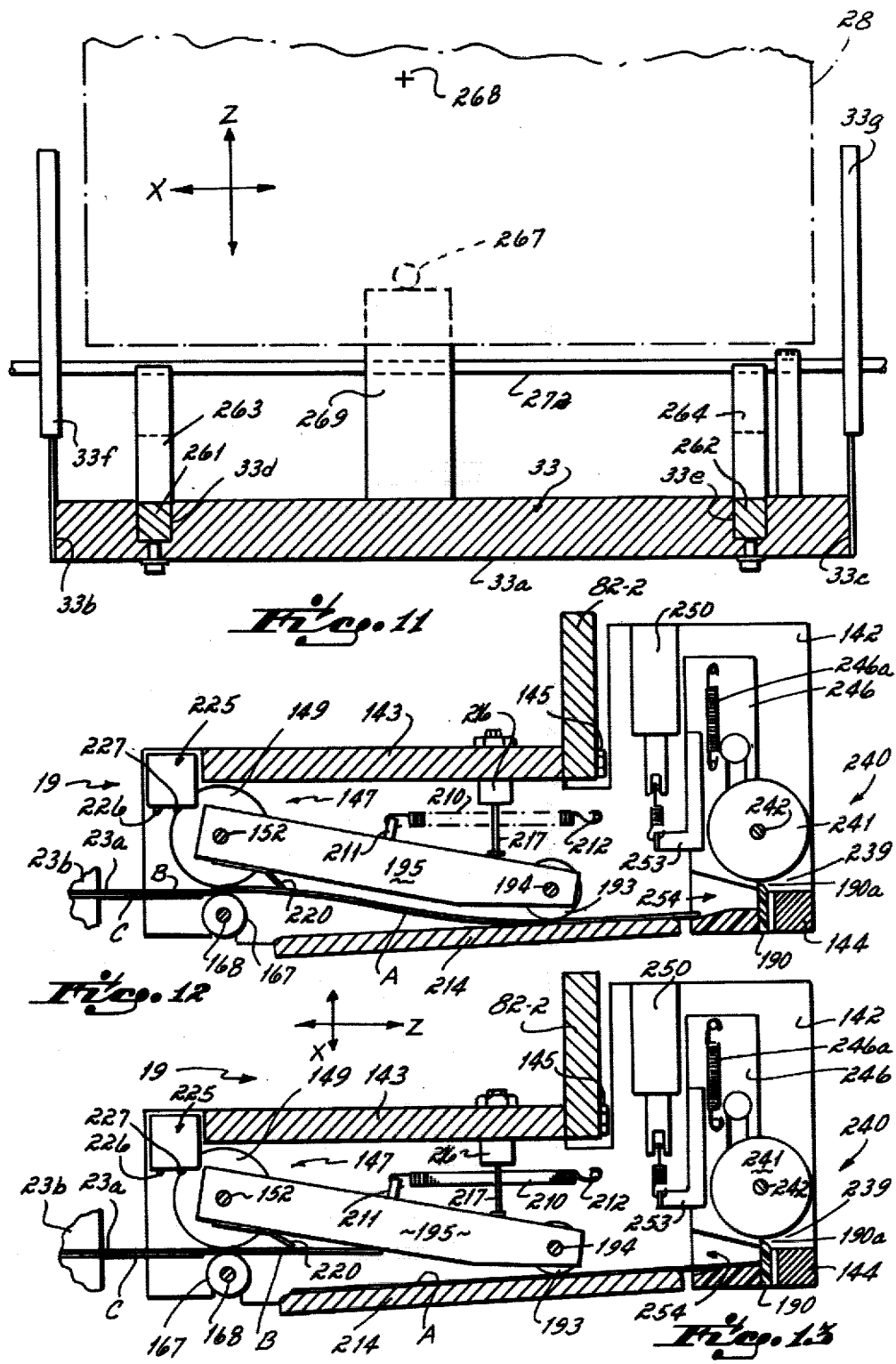

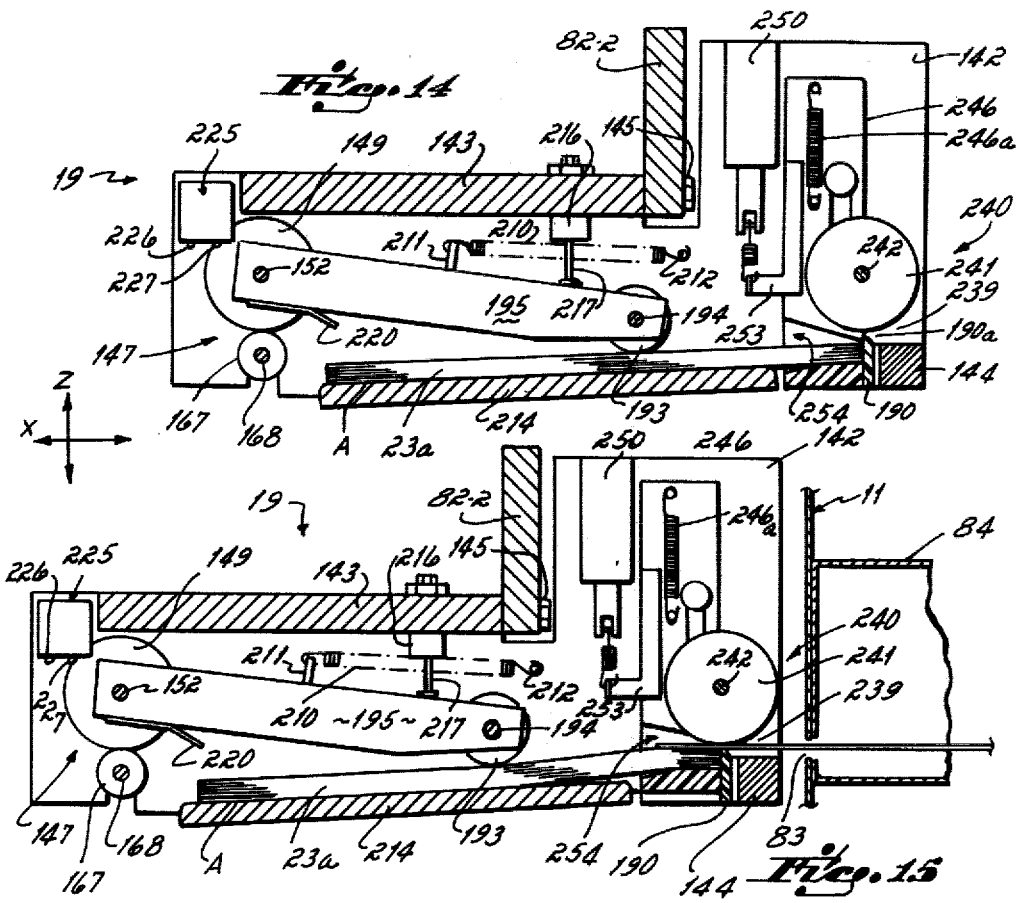
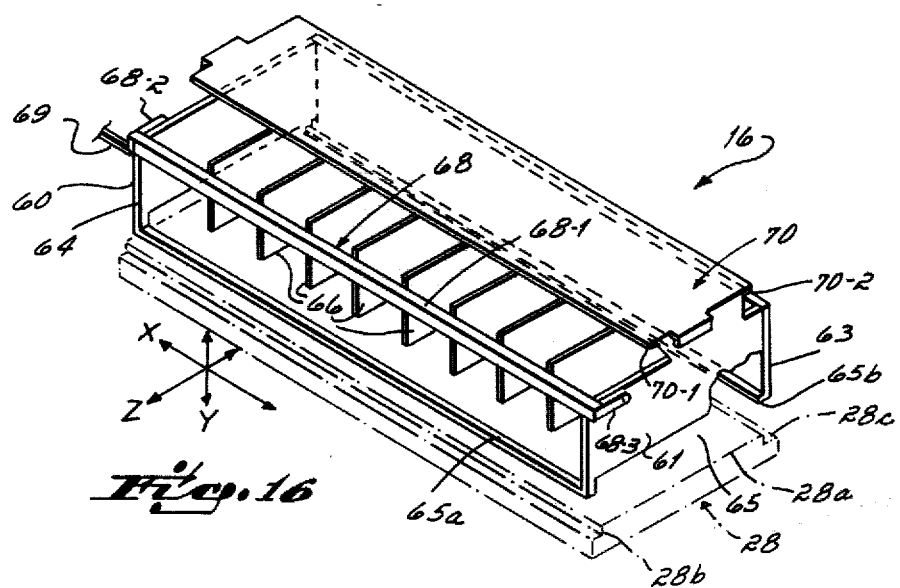

DOCUMENT RETRIEVAL SYSTEM

This invention relates to mechanized document retrieval, and more particularly to automated apparatus for selecting and removing desired documents from different positions within a deck and thereafter accumulating them in a stationary container remote from the deck.

For many years automated document retrieval systems have existed which are capable of automatically selecting and partially ejecting a desired coded document from among a plurality of similarly coded documents stored in a deck. An illustrative system of this type is disclosed in Parry U.S. Pat. No. Re. 27,762. While the Parry system has been a very substantial commercial success, its full potential has not been achieved in certain applications by reason of the fact that heretofore it was necessary to manually remove from the deck the partially ejected documents which were automatically selected by the retrieval apparatus. This "manual removal" requirement is particularly undesirable where the document selector cooperates with a mass document store containing a large number of individually retrievable document decks. In such systems, the decks are successively transported to the selector, searched, and returned to their respective storage locations in the mass document store, thereby facilitating selection of documents on a successive basis from different decks.

In automated multi-deck systems of the type described, particularly those under microprocessor control, the user can enter through a suitable keyboard or the like the identification numbers of 50-100 documents or more scattered among different decks, and the automated retrieval apparatus, in response thereto, successively retrieves the different decks containing the identified documents and partially ejects from each deck the desired document or documents therein. Unfortunately, in automated retrieval systems of this type heretofore existing, successive decks containing desired documents entered into the system keyboard by the operator cannot be retrieved for searching by the document selector until the selected and partially ejected documents from each previously retrieved deck at the selector are manually removed by the operator. Since retrieval of a deck and its subsequent return to the mass document store remote from the selector consume considerably more time than the actual search of a deck at the selector and manual removal of the selected cards therefrom, there is a substantial amount of wasted operator time in prior art systems represented by the intervals of time required for deck retrieval and return when the operator is doing nothing of a productive nature.

Accordingly, it has been an objective of this invention to provide an automated document retrieval system which eliminates the wasted operator time heretofore existing in prior art systems. This objective has been achieved by eliminating the need for manual removal of selected cards partially ejected from the deck following each deck-searching operation. As a consequence, plural decks can be retrieved, searched, and returned without operator intervention at the conclusion of each deck-searching operation. In accordance with the principles of this invention, the document selector is provided with a selected document removal and temporary storage assembly mounted for traversal along a path adjacent the deck proximate the point where the leading edges of selected cards are located when partially ejected from the deck as a consequence of selector operation. The traversing assembly includes a document-engaging element movably mounted thereon for initially engaging selected documents during traversing movement therealong and initiating advancement thereof toward a temporary storage zone incorporated in the traversing assembly. Further included on the traversing assembly are friction drive means which feed selected documents, initially advanced by the movable document-engaging element, into the temporary storage zone with the leading edges thereof in registry with a first document stop member and the faces of the selected documents disposed parallel to a second document stop member. The traversing assembly also includes a document ejecting mechanism which, when the traversing assembly returns to its home position following a deck-traversing operation, ejects the selected cards temporarily located in the storage zone thereof into a stationary container for accumulation and removal at the convenience of the operator.

In accordance with a further aspect of the invention, the friction drive means of the traversing assembly includes a first friction drive assembly located proximate the movable document-engaging element, and a second friction drive assembly spaced from the first friction drive assembly (measured in the direction of document removal) a distance substantially equal to the length of a document. The second friction drive assembly has a document advance speed which exceeds that of the first friction drive assembly, insuring that the trailing edge of a "first" removed document being driven by the second friction drive assembly clears the leading edge of a "second" removed document being driven by the first friction drive assembly. This, in turn, insures that successive documents removed from the deck are not driven between the preceding document and the second document stop which, if permitted to occur, would prevent successive documents from drivingly engaging the second friction drive assembly and being advanced thereby to locate their respective leading edges against the first document stop as is desirable for subsequent ejection into the accumulation container.

In accordance with a still further aspect of the invention, the traversing assembly is provided with a document shifting mechanism. This shifting mechanism maintains removed documents temporarily located in the storage zone of the traversing assembly against the second document stop and out of engagement with the ejection mechanism while the traversing assembly travels along the deck removing and temporarily storing documents, but which, when the traversing assembly has completed deck traversal and returned to its home position, shifts the removed documents into engagement with the ejection mechanism for ejecting the removed documents into the accumulation container for subsequent removal at the convenience of the operator.

In accordance with a further feature of the invention, the documents are provided with a ferromagnetic chip in the leading edge thereof, and the document-engaging member which is mounted on and movable relative to the traversing assembly takes the form of a rotating magnet which magnetically attracts the chip of selected documents as the deck is traversed to advance them toward the temporary storage zone into engagement with the first friction drive assembly, thereby promoting complete removal of selected documents from the deck. An aspect of this feature of the invention is the provision of an elongated magnet disposed transversely to the ferromagnetic chips of the documents in the deck for aiding selection movement of the desired documents and partial ejection thereof from the deck during the document selecting operation, which transverse magnet at the conclusion of the document selection operation drops below the traversing assembly. This prevents mechanical interference between the traversing assembly and the transverse document selecting magnet as the traversing assembly moves along the deck to remove and temporarily store documents selected with aid of the transverse magnet.

An important advantage of this invention is that manual removal from a deck of selected documents partially ejected therefrom is totally unnecessary. As a consequence, plural decks each containing desired documents can be successively retrieved and searched at the selector and the documents so selected automatically removed and accumulated in a stationary container separate from the selector without attendance of an operator. When all documents desired by the operator, for example, 50-100 or more located in a number of different decks, have been selected, removed, and accumulated, only then need the operator be in attendance to remove the accumulated documents from the stationary container to which they were transferred from their respective decks by the traversing assembly. Thus, apart from the need for an operator to enter into the keyboard the identity of the desired documents and to remove an accumulation of such documents from a single container after the various decks containing the identified documents have been successively retrieved and searched, operator attendance is unnecessary.

These and other features, advantages, and objectives of the invention will become more readily apparent from a detailed description thereof taken in conjunction with the drawings in which:

FIG. 1 is a front perspective view of the document retrieval system of this invention showing the general relationship of a mass document store consisting of plural, selectively retrievable cartridges normally stored at different addressable crypts with each cartridge containing a large number of randomly stored documents, for example, 2000 or more, having coded notches along the bottom sorting edge thereof; a document selector which selects a desired coded edge-notched document from a retrieved cartridge located thereat containing a large number of such documents; a cartridge retriever for transporting cartridges between the document selector and a selected crypt whereat the cartridge is normally stored; and a selected document removal/accumulation apparatus associated with the document selector for removing and accumulating one or more selected documents from different retrieved cartridges sequentially delivered to the document selector.

FIGS. 2a-2f are schematic side perspective views of the principal elements of the document selector showing their relative positions during different stages of the process of selecting a desired coded edge-notched document from among a plurality of undesired documents of a retrieved cartridge located at the selector.

FIG. 3 is a front elevational view of the document selector with a retrieved cartridge operatively located thereat with the bottom coded edge-notched cards thereof supported on the selector platen, and the selected document removal/accumulation apparatus located in its home position rightwardly of the document selector.

FIG. 4 is a cross-sectional view along line 4—4 of FIG. 3 showing the lefthand side of the selected document removal/accumulation apparatus and its relationship to the document selector and the documents of a retrieved cartridge located thereat.

FIG. 5 is a cross-sectional view along line 5—5 of FIG. 3 showing the top of the selected document removal/accumulation apparatus when in its home position, and its relationship to the document selector having a retrieved cartridge located thereat.

FIG. 6 is a cross-sectional view along line 6—6 of FIG. 4 showing the selected document removal/accumulation apparatus.

FIG. 7 is a cross-sectional view along line 7—7 of FIG. 6.

FIG. 8 is a cross-sectional view along line 8—8 of FIG. 6.

FIG. 9 is a cross-sectional view along line 9—9 of FIG. 6.

FIG. 10 is a cross-sectional view along line 10—10 of FIG. 9.

FIG. 11 is a cross-sectional view along line 11—11 of FIG. 9 showing the transversely disposed magnet and its associated movable mount.

FIGS. 12, 13, and 14 are top plan views of the selected document removal/accumulation apparatus showing the various components thereof during different stages of removal and accumulation of documents selected by the document selector from a cartridge located thereat.

FIG. 15 is a top plan view of the selected document removal/accumulation apparatus showing the position of the various components thereof during transfer of selected documents therein to a stationary container for accumulation.

FIG. 16 is a front perspective view of a preferred cartridge suitable for use with the apparatus of this invention.

FIG. 17 is a schematic side elevational view of an uncoded document useful in the preferred document selector of this invention.

The document retrieval apparatus of this invention, as more particularly seen in FIG. 1, includes a mass document store 10 located within a cabinet 11. The mass document store 10 includes a plurality of addressable crypts C-1, C-2, . . . C-n arranged vertically one above the other in adjacent columns 12-1, 12-2, . . . 12-n. Normally stored in each one of the crypts C of the crypt column 12 is a cartridge 16. Each cartridge 16, which is shown in more detail in FIG. 16, contains a plurality of randomly stored, coded, edge-notched documents, preferably cards of the type shown in FIG. 17 to be described in more detail hereafter, although other types of documents can be utilized. Each cartridge 16 is removably supported along the top thereof in its respective crypt C-1, C-2, . . . C-n by a pair of generally horizontal, spaced-apart, confronting, cartridge support rails 18 and 20, with respect to which associated ledges 70-1 and 70-2 (FIG. 16) mounted on the cartridge slide to facilitate insertion and removal of the cartridge with respect to its crypt.

A cartridge retriever 22 is also provided which is selectively indexable horizontally along the Z axis in a forward/rearward direction to align itself with individual crypt columns 12-1, 12-2, . . . 12-n and selectively indexable vertically along the Y axis in alignment with selected ones of the crypts C-1, C-2, . . . C-n of a selected crypt column. In addition to the cartridge retriever 22 being selectively positionable in a horizontal direction along the Z axis in alignment with a particular vertical crypt column, and positionable in a vertical direction along the Y axis in alignment with a particular crypt of a selected column, the cartridge retriever 22 also includes means (not shown) for engaging a cartridge aligned therewith and transferring it in a horizontal direction parallel to the X axis from its associated crypt onto the cartridge retriever as well as returning a cartridge on the cartridge retriever to its associated crypt. The horizontal and vertical drive means (not shown) of the cartridge retriever 22 are also operable to deliver a retrieved cartridge in operative relation to a platen 28 of a card selector 26-1, to be described in more detail hereafter, as well as return a cartridge from the card selector to its associated crypt.

A crypt array and cartridge retriever suitable for use in this invention are described in U.S. Pat. No. 3,786,916 in the name of Richard C. O'Brien, assigned to O.K. Partnership. The entire disclosure of U.S. Pat. No. 3,786,916 is expressly incorporated herein by reference. A platen 28 suitable for use in the document selector 26 of this invention is also described in U.S. Pat. No. 3,786,916.

The card selector 26-1, in a preferred form of the invention, is located adjacent the forwardmost crypt column 12 at a point below the lowermost crypt therein. The document selector 26-1, except for a document-moving magnet support to be described hereafter, is preferably of the general type disclosed in Parry U.S. Pat. No. Re. 27,762, the entire disclosure of which is specifically incorporated herein by reference. The Parry et al selector 26, as schematically shown in FIG. 1 and FIGS. 2a-2f, includes a stationary, horizontally disposed, planar platen 28 which supports a cartridge 16 containing a deck of approximately 2000 randomly stored, vertically disposed documents, e.g., cards 23. The cards 23 each are disposed generally in the Y-Z plane, with their bottom code-notched sorting edges resting atop the platen. Also included in the selector 26-1, and described in more detail hereafter, is a transversely disposed elongated electromagnet 29 common to all the cards 23 and in alignment with ferromagnetic chips 31 implanted in the leading edges 44 of the cards. A drawer 33 is mounted for sliding movement between an outer position (FIG. 2f) in which the magnet is displaced forwardly and below the forward lowermost corner of a selected card 23a and an inner position (FIGS. 2a and 2b) in which the magnet 29 is in contact with the ferromagnetic card implants 31 when the cards 23 are stored in their normal home position on the platen 28 (FIGS. 2a and 2b). In the course of moving from the inner position (FIGS. 2a and 2b) to the outermost position (FIG. 2f), the drawer 33 moves between a first intermediate position (FIG. 2c), in which the desired card 23a is withdrawn by the moving magnet 29, to a partially selected position and a second intermediate position (FIG. 2d) in which the desired card 23a is moved to a fully selected position by the moving magnet.

As best seen in FIGS. 2a-2f and 17, the cards 23 each have a toothed sorting edge 32, preferably the lower edge thereof, provided with alternate teeth 34-1 to 34-6 and registration notches 35-1 to 35-6. Each of the teeth 34-1 to 34-6 is susceptive of being encoded in binary by selected removal, as by notching, of the tooth. Six teeth and six registration notches are shown for simplicity, although in practice it will be understood that substantially more teeth and registration notches are usually provided for the purpose of increasing the coding capacity of the system. For example, in a typical installation, the cards 23 are each provided with sixty encodable teeth which, when divided into twelve groups of five teeth each, can be utilized to encode twelve characters, for example, letters and/or numerals in a conventional two out of five code format. Two of the characters can then be utilized to represent the address in binary-coded-decimal form of the particular cartridge of a multi-cartridge storage system in which the card is typically stored, while the remaining ten characters can be utilized to identify the card with respect to the other cards stored in that cartridge.

The sorting edge 32 further includes a lock notch 36 located between the group of encodable teeth 34 and registration notches 35 and the rear vertical card edge 38, herein called the "trailing edge". Adjacent to the lock notch 36 is a removed portion 40 of the card 23 located intermediate the lock notch 36 and the trailing edge 38. The card 23 further includes the ferromagnetic chip 31 implanted in the front vertical card edge 44, herein termed the "leading edge".

When the cards 23 of a cartridge 16 located in the selector 26-1 are in their normal unselected position on the selector platen 28, the registration notches 35-1 to 35-6 and the lock notch 36 are aligned with a plurality of transversely disposed select bars or blades 48-1 to 48-6 and a lock bar or blade 50 which are disposed transverse to, and in common with, all the cards, that is, a direction parallel to the X axis. Both the sorting bars 48-1 to 48-6 and the lock bar 50 are approximately positioned in slots formed in the upper surface of the platen 28. The select bars 48-1 to 48-6 and the lock bar 50 are elevatable vertically between a lower reset position wherein the upper edges thereof are flush with the upper surface 28a of the platen 28, and an upper set position wherein the sort bars extend above the platen surface 28a into the associated registration and lock notches 35-1 to 35-6 and 36, respectively, of cards located atop the platen. Elevation of the bars 48-1 to 48-6 and 50 is effected by solenoids controlled by a keyboard console or a specially programmed microprocessor.

Assuming cards 23 are properly located on the platen 28 of selector 26-1 (FIG. 2a), by virtue of having retrieved and deposited a selected cartridge thereon, to select a card or cards 23 having a particular code, for example, a card 23a having teeth 34-2 and 34-6 removed, from among a group of cards 23b not having teeth 34-2 and 34-6 removed, the appropriate sort bars 48 are elevated above the platen surface 28a to the set position. Specifically, sort bars 48-2 and 48-6 corresponding to the removed tooth pattern of the desired card 23a are elevated to the position shown in FIG. 2b. With the sort bars 48-2 and 48-6 in the set position, the desired cards 23a having teeth 34-2 and 34-6 removed can be shifted forwardly along the Z axis, a distance equal to the width of one tooth, to produce an initial or partial separation of the desired cards 23a from the undesired cards 23b. However, the undesired cards 23b not having tooth 34-2 and/or 34-6 removed are restrained from forward movement in a direction parallel to the Z axis by one or both of the set or elevated select blades 48-2 and 48-6, which, in the set position, mechanically interfere with the unremoved teeth 34-2 and 34-6 of the undesired cards 23b.

With the select blades 48-2 and 48-6 conforming to the removed tooth pattern of the desired card 23a in the set position, the drawer-mounted magnet 29 is shifted by a drawer 33 forwardly parallel to the Z axis a distance equal to the width of one tooth to the position shown in FIG. 2c. Those cards free to shift, namely, the desired cards 23a, move with the magnet 29 a distance of one tooth width effecting an initial or partial separation of the desired and undesired cards. Movement of the desired cards 23a in this fashion aligns the removed portion 40 of the desired cards opposite the lock blade 50. The undesired cards 23b do not move forwardly in the direction parallel to the Z axis by reason of the engagement of one or more of the unremoved teeth 34-2 and 34-6 with the select blades 48-2 and 48-6, respectively. Consequently, the lock notches 36 of the undesired cards 23b remain aligned with the lock blade 50. At this point the initial or partial separation phase of the card selection operation is complete.

Further separation of the desired cards 23a from the undesired cards 23b in a retrieved cartridge at the selector 26-1 to effect the final card selection phase of the retrieval operation is accomplished by elevating to a set position the lock blade 50 and returning to an unset position the select blades 48-2 and 48-6, as shown in FIG. 2d. Setting lock blade 50 prevents the undesired cards 23b from moving forwardly in response to the continued forward movement of the magnet 29 in a direction parallel to the Z axis. Resetting or lowering the sort blades 48-2 and 48-6 after the initial card separation phase enables the selected cards 23a to continue forward movement parallel to the Z axis in response to movement of the magnet 29 in this direction by reason of the unremoved portion 40 thereof being aligned with the elevated set block bar 50.

With the lock bar 50 elevated and the selected bars 48 all in their lower reset position, the magnet 29 is advanced further forwardly in a direction parallel to the Z axis to the position shown in FIG. 2e, further separating the desired cards 23a from the undesired cards 23b. At this point, the final card selection phase of the retrieval cycle is complete, marking the completion of the card selection operation. For reasons to become apparent hereafter, upon conclusion of the card selection operation, the magnet 29 is de-energized to release the desired cards 23a in the fully selected position shown in FIG. 2e, and the drawer 33 and magnet 29 are moved forwardly to the position shown in FIG. 2f, wherein they are located below the cards.

It is significant to note that the desired cards 23a which have been selected from the cards in the retrieved cartridge located at the selector 26-1 are not fully removed or withdrawn from the remaining undesired cards 23b. Thus, at this point the desired cards 23a have been selected from the undesired cards 23b and displaced forwardly thereof in a direction parallel to the Z axis a substantial distance, but a distance which is less than the length of the card defined by the distance between its leading edge 44 and trailing edge 38.

It is also significant to note that as a result of the card selection operation just described, plural cards may have been selected and advanced to the fully selected position shown in FIG. 2e. Additionally, the plural selected cards, by reason of the fact that the cards are randomly stored in the cartridge, can be located at any point in the cartridge. For example, the plural selected cards may each be spaced from each other along the X axis by a distance of one or more inches, or alternatively, the selected cards may be grouped together immediately adjacent to each other.

In card selectors of the type heretofore known, such as described in Parry U.S. Pat. No. Re. 27,762 and O'Brien U.S. Pat. No. 3,786,916, the desired card or cards, once advanced to the fully selected position shown in FIG. 2e, were manually removed by an operator by grasping the upper front corner of the card and physically withdrawing from the cartridge. If 10 to 15 cards were selected from a given cartridge by selector 26-1, manual removal of each card could be a relatively time consuming operation. In addition, if it were necessary to select multiple cards from different cartridges, it would be necessary to manually remove the selected card(s) from each cartridge before the successive cartridge could be retrieved and the desired card(s) selected and removed. Thus, if a search necessitated retrieval of 10 or 15 cartridges and cards selected and removed from each successively retrieved cartridge, the operator must continuously remain in attendance while the successive cartridges are each retrieved and deposited at the selector, the selection operation performed, and the cartridges returned to their respective crypts. This constitutes a considerable waste of operator time, particularly since actual removal by the operator of cards selected from the successively retrieved and searched cartridges constitutes a mere fraction of the total time necessary to retrieve, search, and return the plural cartridges to their respective crypts.

To minimize the need for the operator to manually remove selected cards from retrieved cartridges at selector 26-1, a selected card removal/accumulation device 19, to be described more fully hereafter, is provided. The device 19 functions to automatically remove and accumulate in a container 84 cards selected from retrieved cartridges delivered to selector 26-1 by cartridge retriever 22.

The preferred embodiment of this invention, as shown in FIG. 1, further includes two independent buffer selectors 26-2 and 26-3, each having associated with it a cartridge 16-2 and 16-3 of cards 23-2 and 23-3 encoded in the manner described in connection with FIGS. 2a–2f and 17. While only two buffer selectors 26-2 and 26-3 are shown, more or less can be used. The buffer selectors 26-2 and 26-3 and associated cartridges 16-2 and 16-3 of cards 23-2 and 23-3 are substantially identical to the selector 26-1 and its cartridge 16-1 of cards 23-1, except that the movable magnets 29-2 and 29-3 and drawers 33-2 and 33-3 thereof only move between the inner rearward position shown in FIG. 2a and the outer forward position shown in FIG. 2e; the magnets and drawers do not drop below the cards as shown in FIG. 2f. The independent buffer selectors 26-2 and 26-3 search their respective cartridges 16-2 and 16-3 of encoded cards 23-2 and 23-3 simultaneously with the searching of cards 23-1 of cartridge 16-1 located in selector 26-1. The cartridges 16-2 and 16-3 of selectors 26-2 and 26-3, in whole or in part, can be divided into compartments for holding cards with respect to which specific functions are to be carried out.

For example, cartridge 16-2 of selector 26-2 in its entirety may be utilized for temporarily holding, such as for a day or week, new cards ultimately to be stored in the mass data store 10. By temporarily storing new cards, which are ultimately destined for document store 10, in the buffer selector cartridge 16-2 of buffer selector 26-2, such temporarily stored new cards are available for search and selection notwithstanding that the new cards have not yet been positioned in their particular cartridges 16-1 normally stored in the mass document store 10.

In a similar manner, other buffer selector cartridges, such as cartridge 16-3 of buffer selector 26-3, can be dedicated to temporarily holding cards retrieved from the mass document store 10 with respect to which other functions are to be performed. For example, buffer selector cartridge 16-3 of buffer selector 26-3 may be divided into compartments 16-3a, 16-3b, 16-3c, and 16-3d into which cards retrieved from mass document store 10 are temporarily stored while awaiting duplication, copying, updating, and refiling in the document store 10, respectively.

In certain system installations the cards 23-1 stored in cartridges 16-1 of the mass document store 10 must periodically be retrieved and copied. Often the actual copying of cards retrieved from the document store 10 in a given day will be made at one time, for example, at the end of the day, while the system operator may actually retrieve from the document store 10 the cards which are to be copied intermittently throughout the entire day. For example, cards retrieved from the document store 10 and delivered to the container 84 by the selected document removal/accumulation device 19 are periodically transferred throughout the day to the compartment 16-3b of buffer selector cartridge 16-3 of buffer selector 26-3. At the end of the day the retrieved cards to be copied, which have been placed in compartment 16-3b, are removed and copied. Following this, the cards are placed in the refile compartment 16-3d. Eventually the cards in the duplicate, copy, and update and refile compartments 16-3a through 16-3d of buffer cartridge 16-3 and new cards located in the in-file buffer cartridge 16-2 are returned to their respective cartridges in the document store 10. Such may occur on a weekly basis, or on some other basis, either more or less frequently.

Importantly, cards which have been retrieved from the document store 10 and which are to be copied, duplicated, or updated and located in their respective duplicate, copy, and update buffer cartridge sections 16-3a, 16-3b, 16-3c, remain in the system and susceptive of being searched at all times except for the brief period when they are actually removed from their respective buffer cartridge sections at the end of the day and duplicated, copied, or updated. Thus, by virtue of buffer cartridge 16-3, which is searched simultaneously with respect to the cartridge 16-1 of document selector 26-1, cards which have been retrieved from the document store 10 and which are to be operated upon at a later time remain in the system and capable of retrieval by buffer selector 26-3 on a continuous basis except for the very brief period when they are actually removed from the buffer selector cartridge 16-3 for duplication, copying, updating, or the like.

As seen in FIG. 16, the cartridges 16, in a preferred form, each include spaced vertical side walls 60 and 61 and a rear vertical wall 63 which spans the side walls 60 and 61 proximate their rear vertical edges. The cartridge 16 also includes an open front wall 64 through which selected cards are advanced to the position shown in FIG. 2e, and an open bottom 65 which functions to expose the sorting edges of the cards in the cartridge for operative cooperation with the select blade 48 and lock blade 50 when the cartridge is deposited on upper surface 28a of the platen 28 of the document selector 26-1. To prevent the cards 23 in the cartridge 16 from falling under the force of gravity through the open bottom 65 thereof, front and rear card support rails 65a and 65b spanning the lower front corners and the lower rear corners, respectively, of the side walls 60 and 61, are provided. The support rails 65a and 65b underlie the forward and rear portions of the sorting edge 32 of each card in the cartridge proximate the leading and trailing edges thereof. When the cartridge 16 is seated on platen 28 of selector 26-1, rails 65a and 65b seat in grooves 28b and 28c (FIG. 1) provided along the front and rear edges of the platen, thereby enabling the lower card sorting edges to contact platen top surface 28a.

To maintain the cards 23 in the cartridge 16 in a generally vertical orientation, separator panels 66 vertically disposed at periodic intervals between the side walls 60 and 61, are provided. The separator panels 66 are preferably secured along their respective rear vertical edges to the rear vertical wall 63 of the cartridge 16.

To selectively block the open front wall 64 of the cartridge 16 while the cartridge is being transported by the cartridge retriever 22 between its crypt and the selector 26-1, as well as when the cartridge is stored in its crypt, a pivotal card retainer 68 is provided. The card retainer 68 includes a central elongated portion 68-1 disposed in a direction generally transverse to the side walls 60 and 61 and the separator panels 66, and a pair of rearwardly extending brackets 68-2 and 68-3 which are pivotally mounted to the exterior of the side walls 60 and 61, respectively.

When a retrieved cartridge 16 is deposited on the platen 28 of the card selector 26-1, the retainer 68 is pivoted upwardly above the upper edge of the open cartridge front wall 64, permitting selected cards 23a to be advanced out of the cartridge to the position shown in FIG. 2e. Pivotal movement of the retainer 68 to the card unblocking position (FIG. 1) when the retrieved cartridge is deposited on platen 28 of the selector 26 can be accomplished by providing a stationary abutment 69 (FIG. 1) in the path of the retainer 68. The abutment 69 functions to effectively pivot the retainer 68 to its upper unblocking position as the retrieved cartridge is lowered onto the platen 28 of the card selector 26-1 by cartridge retriever 22. As the retrieved cartridge at the selector 26-1 is being elevated upwardly by the cartridge retriever 22 for return to its associated crypt, the retainer 68 automatically pivots downwardly to return to its lower, card blocking position to preclude horizontal movement of the leading edges 44 of cards in the cartridge through the open front wall 63.

Rigidly interconnected with the upper edges of the side walls 60 and 61 and the vertical separator panels 66 is a cartridge suspension member 70 having forwardly and rearwardly extending ledges 70-1 and 70-2 which slideably engage the upper surfaces of the confronting rails 18 and 20 of the crypt for slideably supporting the cartridge in the crypt. Ledges 70-1 and 70-2 also slideably engage confronting rails (not shown) on cartridge retriever 22 to support a retrieved cartridge in transit between its crypt and the selector 26-1.

The selected card removal and accumulation device 19, hereinafter for convenience referred to as the "accumulator", is now described in detail with reference to FIGS. 3–15. More specifically, and with particular reference to FIGS. 3–6, the accumulator 19, which is associated with selector 26-1, is seen to include a movable assembly 80 mounted on a carriage 82 for reciprocating motion in a direction parallel to the X axis forward of the platen 28. The assembly 80, as it traverses along a path parallel to the X axis forwardly of the platen 28 of selector 26-1, functions to successively remove cards in the fully selected position (FIG. 2f) which have been selected from a cartridge 16-1 at the selector 26-1 in the manner heretofore described in connection with FIGS. 2a-2f. The assembly 80, in addition to removing selected cards from the cartridge 16-1 located on platen 28 of selector 26-1, is also operative to temporarily store all selected cards which have been removed from the cartridge until such time as the assembly 80 returns to its home position shown in FIG. 3 rightwardly of the selector. When accumulator assembly 80 reaches its home position, the temporarily stored cards removed from the cartridge 16-1 at selector 26-1 are ejected through a slot 83 formed in the housing front panel 11 into the container 84 aligned therewith.

The cartridge 82, as shown best in FIGS. 3 and 4, is generally L-shaped having a lower horizontal section 82-1 and an upper vertical section 82-2. The vertical carriage section 82-2 is provided at its upper end with a pair of guide rollers 86 and 88 rotatably mounted on vertical shafts 90 and 92 anchored at their lower ends to a horizontal platform 94 which is secured to the upper rear surface of the vertical carriage section 82-2 by an angle bracket 96. The guide rolls 86 and 88 are spaced apart to guidingly engage rear and front vertical guide surfaces 97 and 98, respectively, of a stationary horizontal guide rail 100. The guide rail 100, which is supported at its opposite ends by stationary vertical plates 101 and 103, is disposed parallel to the X axis above and forwardly of the front edge of the platen 28 of the selector 26-1. Guide rail 100 functions to guide the upper portion of the carriage 82 for reciprocating motion parallel to the X axis forwardly of the platen 28 of the selector 26-1.

The lower carriage section 82-1 at its opposite ends is provided with vertically extending brackets 102 and 104 which are secured to opposite ends 106 and 108 of a drive chain 110. The drive chain 110 engages sprockets 112 and 114 mounted on horizontal shafts 116 and 118. The shaft 118, which is not driven, is mounted in a stationary bearing block 120, thereby enabling the sprocket 114 to function as an idler sprocket. Shaft 116 to which sprocket 112 is mounted is supported in a bearing block 122. The rear end of the shaft 116 is driven by a motor 124 mounted to a stationary plate 126 extending laterally from the fixed side frame 101. Sprocket 112 is bidirectionally driven by the motor 124 to reciprocate the carriage frame 82 parallel to the X axis.

To guide the lower carriage section 82-1 in a direction parallel to the X axis, guide blocks 128 are mounted to the rear of depending extensions 102 and 104 extending downwardly from the lower carriage section 82-1. The guide blocks slidingly engage a stationary horizontal guide rod 130 disposed parallel to the X axis. The guide rod 130 is stationarily mounted to the forward edge of a horizontally disposed bar 132 of an extrusion having a vertical web 134 which is secured to a stationary horizontal channel member 136.

With reference to FIGS. 6, 7, and 10, the accumulator assembly 80 is seen to include a rigid frame consisting of a top plate 141, a bottom plate 142, a side plate 143 to which the upper and lower plates 141 and 142 are rigidly connected, and a front vertical post 144 positioned between and rigidly secured to the lefthand front corner of the upper and lower plates. The accumulator assembly frame 141-144 is fixedly secured to the carriage 82 by bolting the front edge of the side plate 143 to the left rear surface of the vertical carriage section 82-2 with fasteners 145. In this way, the accumulator assembly 80 is rigidly secured to the carriage and reciprocates horizontally in a direction parallel to the X axis as the carriage 82 reciprocates in an X-Y plane along guide members 100 and 130.

Accumulator assembly side plate 143 is fastened to vertical carriage section 82-2 at an elevation appropriate to locate the upper surface of plate 142 flush with the upper surface 28a of the selector platen 28 of the document selector 26-1 to facilitate sliding transfer of a selected card 23a from a cartridge 16-1 positioned on the platen 28 at document selector 26-1 onto the plate 142 of the accumulator 19. The top plate 141 of the accumulator assembly 80 is positioned above the bottom plate 142 a distance sufficient to permit a selected card 23a sliding on the plate 142 from platen 28 to have its upper edge 24 clear the lower surface of the top plate 141.

To initiate removal of a selected card 23a which has its leading edge 44 projecting forwardly in the Z direction relative to the undesired cards 23b of a cartridge 16-1 located at the card selector 26-1, a card withdrawal assembly 147 is provided on accumulator assembly 80. The card withdrawal assembly 147 includes an upper driven friction roll 148, a lower driven friction roll 149, and a driven magnet wheel 150 the periphery of which exhibits circumferentially alternating north and south magnetic poles. The driven friction rolls 148 and 149, as well as the driven magnet wheel 150, are keyed or otherwise fixed for rotation with a driven shaft 152 vertically disposed for rotation in a lower bearing 153 anchored in the bottom plate 142 and an upper bearing 154 anchored in the top plate 141. The upper end of the shaft 152 has a pulley 155 secured to it. A motor 157 is secured to the plate 141 such that the motor output shaft 158 is disposed vertically, passing freely through a suitably disposed aperture (not shown) in the top plate 141. A pulley 159 is secured to the upper end of the motor shaft 158. A drive belt 169 engages pulleys 155 and 159 to drive the shaft 152 and in turn the upper and lower driven rolls 148 and 149 and the driven magnet wheel 150. The motor shaft 158 rotates in a direction such as to produce counterclockwise rotation of the driven friction rolls 148 and 149 and the magnet wheel 150, as viewed in FIG. 10.

The magnet wheel 150 is secured to the shaft 152 at a vertical elevation such that it is aligned vertically with the ferromagnetic chip 31 of a selected card 23a positioned with its lower sorting edge on the surface 28a of platen 28 of selector 26-1 and on the upper surface of bottom plate 142. This assures that a selected card 23a will be magnetically attracted to the magnet wheel 150 as the assembly 80 scans the front of the selector 26-1 following a card selection operation, assuring removal of selected cards 23a from the cartridge 16-1 located at the selector 26-1. The upper driven friction roll 148 is positioned vertically to lie slightly below the upper edge 24 of selected cards 23a which have their lower edge supported by the platen surface 28a. The driven friction roll 149 is positioned vertically to engage selected cards 23a at a point slightly above the point where the magnetic wheel 150 magnetically engages the card chip 31. Collars 162 and 163 located above friction wheel 149 and below magnetic wheel 150, respectively, are fixed relative to the shaft 152 for locating wheels 149 and 150 at the desired vertical elevation. A collar 164 disposed below driven wheel 148 is fixed to shaft 152 for locating the upper driven wheel 148 at the desired vertical elevation.

Cooperating with the friction rolls 148 and 149 are a pair of upper and lower friction rolls 166 and 167 which are keyed or otherwise fixed for rotation with a shaft 168. Shaft 168 is free to rotate in lower and upper bearing blocks 169 and 170. Bearing blocks 169 and 170 are provided with a square cross-section to permit the bearing blocks, and hence the shaft 168 and the friction wheels 166 and 167, to move in a direction toward and/or away from driven friction rolls 148 and 149. An upper tension spring 172 and a lower tension spring 173 urge the shaft 168, and hence the friction rolls 166 and 167, toward the driven rolls 148 and 149. Spring 172 is connected between the upper end 168a of the shaft 168 and a vertical pin 175 anchored at its lower end to the top plate 141. Spring 173 has one end connected to the lower end 168b of shaft 168 and the other end to the lower end of a pin 177 which is anchored at its upper end to the bottom plate 142.

For purposes to become more apparent hereafter, the shaft 168, and hence the friction wheels 166 and 167, have applied thereto frictional drag for the purpose of applying a braking torque. The frictional braking torque is applied to the shaft 168, and hence to the wheels 166 and 167, by means of a first annular friction disc 180 which is coaxially fixed to the bearing 170 and a second annular friction disc 182 which is splined to the shaft 168 such that it can move vertically with respect thereto, but not rotationally. A compression spring 184 located between the friction disc 182 and a vertically adjustably positionable nut 186 is provided to regulate the frictional force between the friction discs 180 and 182, and hence the braking torque applied to the shaft 168 and, in turn, the friction rolls 166 and 167. By advancing the nut 186 downwardly or upwardly the degree of compression of the spring 184 is increased or decreased, applying greater or lesser frictional force between the discs 180 and 182 and greater or lesser amounts of braking torque to the shaft 168 and in turn to the wheels 166 and 167. A suitable lock nut 188 is provided for locking the spring compression adjusting nut 186 in the desired vertical position with respect to the upper threaded end of the shaft 168.

The effect of applying torque to the friction wheels 166 and 167 is to preclude the removal of more than one selected card 23a at a time by driven friction rolls 148 and 149. The braking torque applied to the friction wheels 166 and 167 should be such that these wheels apply a retarding force to a card fed between rolls 148, 149 and rolls 166 and 167 which is less than the card-removal force applied to the card by the driven rolls 148 and 149. In this way, if two cards enter the nip defined by driven friction rolls 148, 149 and braked rolls 166 and 167, the force applied in the forward Z direction to the card in contact with the driven rolls 148 and 149 by these driven rolls will exceed the retarding frictional force applied to the card in contact with the braked fraction rolls 166 and 167 by these rolls. Thus, if two cards simultaneously enter the nip defined by driven friction rolls 148, 149 and braked friction rolls 166 and 167, the card in contact with the driven rolls 148 and 149 will be withdrawn from the cartridge and advanced forwardly in the Z direction while the other card in contact with the braked rolls 166 and 167 will not be advanced to any significant extent in the forward Z direction.

Of course, when two cards enter the nip of rolls 148, 149 and 166, 167, the retarding force applied to a card by the braked friction rolls 166 and 167 must exceed the friction force applied to such card by the other card in contact with driven rolls 148 and 149 which is being advanced in the forward Z direction by the action of the driven friction rolls 148 and 149. Otherwise, if two cards enter the nip between rolls 148, 149 and 166, 167, the net force on the card in contact with the braked rolls 166 and 167 would be such that the card would be advanced in the forward Z direction, albeit at a velocity less than the velocity of the card in contact with rolls 148, 149 which is being driven directly by these rolls. Preferably the force applied to a card by the driven friction rolls 148 and 149 is approximately 5 grams while the frictional drag force applied to a card by the braked friction wheels 166 and 167 is approximately 3 grams. The frictional drag between adjacent cards is approximately 1.0 grams. If a single card enters the nip defined by driven friction rolls 148, 149 and braked friction rolls 166 and 167, a net force in the forward Z direction of approximately 2 grams will be applied to the card. If two cards simultaneously enter the nip, a net advancing force of approximately 1.0 grams will be applied in the forward Z direction to the card in contact with driven friction rolls 148 and 149, while a net retarding force of approximately 2.0 grams will be applied to the card in contact with the braked friction wheels 166 and 167.

To fully advance the leading edge 44 of a card against an appropriately located vertical stop 190 extending upwardly from the bottom plate 142 to which the stop 190 is secured at its lower end, a second pair of driven friction rolls consisting of an upper roll 192 and a lower roll 193 are provided. Friction rolls 192 and 193 are mounted for rotation with a driven shaft 194 disposed vertically in suitable bearings of an elongated C-shaped channel member 195 having upper and lower flanges 196 and 197 and an integral central vertical flange 198 (FIG. 7). The channel member 195 is horizontally disposed and mounted for pivotal motion in a horizontal plane by the vertical shaft 152. Suitable bearings 200 and 201 in flanges 196 and 197 permit the channel member 195 to rotate relative to the shaft 152 which is driven by the motor 157. The friction wheels 192 and 193 are located vertically to contact a selected card 23a withdrawn by the card transport assembly 147 at points slightly below and slightly above, respectively, the upper and lower edges of a selected card 23a. Friction wheels 192 and 193 are fixed to the shaft 194 by hubs 204 and 205 integral with wheels 192 and 193, respectively, the hubs 204 and 205 being suitably keyed or otherwise fixed to the shaft 194. To rotate the shaft 194, and hence the friction wheels 192 and 193, a pulley 206 is fixed to the shaft 194. The pulley 206 is driven via a belt 207 from a pulley 208 keyed to the shaft 152. The channel member 195 is biased in a clockwise direction (FIG. 10) about shaft 152 by a tension spring 210 which has one end connected to a bracket 211 extending from beneath the channel member and the other end secured to a vertical post 212 extending upwardly from the bottom plate 142. The spring 210 biases the driven friction wheels 192 and 193 toward a vertically disposed side plate 214 extending upwardly from the base plate 142. A dashpot 216 having a viscously damped plunger 217 is secured to the side wall 143. The viscously damped plunger 217 at its outer end bears against a vertical flange fixed to the channel member 195 to minimize oscillatory movement of the channel member about its pivotal mounting shaft 152.

The distance between the nip defined by driven rolls 148, 149 and retarding rolls 166 and 167 and the point at which driven rolls 192 and 193 contact the side plate 214 is less than the length of a card measured between the leading and trailing edges thereof. In this way, the leading edge 44 of a selected card 23a being removed from the cartridge by the transport assembly 147 will have its leading edge positively driven into contact with driven rolls 192 and 193 by the action of driven rolls 148 and 149.

The size of the pulleys 206 and 208 relative to each other, as well as the size of the rolls 192 and 193 relative to rolls 148 and 149, are selected such that the peripheral speed of rolls 192 and 193 exceeds that of rolls 148 and 149. Assuming two cards simultaneously enter the nip defined by rolls 148, 149 and rolls 166 and 167, once the trailing edge of the "first" card in contact with rolls 148 and 149 advances forwardly of the nip associated therewith, it will be advanced at a faster rate by rolls 192 and 193 than the rate at which it was advanced by rolls 148 and 149, thereby assuring that the trailing edge thereof will move forwardly of the leading edge of the "second" card which is in contact with braked rolls 166 and 167. After the trailing edge of the "first" card being advanced by rolls 192 and 193 clears the nip defined by rolls 148, 149 and 166, 167, the "second" card which had been in contact with braked rolls 166 and 167 and which was retarded thereby while the "first" card was being advanced by rolls 148 and 149, now comes into contact with rolls 148 and 149 and is advanced by these rolls. Since rolls 192 and 193 have a greater peripheral velocity than rolls 148 and 149, the "first" card now being advanced by rolls 192 and 193 advances at a faster velocity than the "second" card being advanced by rolls 148 and 149. This fact, coupled with a deflector plate 220 secured to the rearward portion of the channel member 195, assures that the trailing edge of the "first" card will be urged toward the side plate 214 and the leading edge of the "second" card will not be driven between the "first" card and the side plate 214 which, if it occurred, would prevent the "second" card from being driven by the rolls 192 and 193. Stated differently, with the trailing edge of the "first" card forwardly of the leading edge of the "second" card and the "first" card urged against the side plate 214 by deflector 220, the "second" card will be driven by rolls 148 and 149 into contact with rolls 192 and 193, assuring that the "second" card will be advanced to locate its leading edge against stop 190 as was the "first" card.

As the accumulator 19 is moved in the X direction by the driven carriage 82 from right to left as viewed in FIG. 1, selected cards 23a extending in the forward Z direction from the cartridge at the selector 26-1 are successively removed from the deck by the action of driven rolls 148, 149 and 192, 193 causing them to be stacked against plate 214 with their leading edges 44 abutting card stop 190, with the first card that was removed being against the plate 214 and successive cards being stacked against them in the order in which they were removed. As the number of selected cards removed by wheels 148, 149 and 192, 193 increases, the thickness of the stack of removed cards against plate 214 and stop 190 increases. This increase in thickness of the stack of removed cards is accommodated by the pivotal mounting of the channel 195 which, while urged against plate 214 by spring 210, is nevertheless free to retract away from plate 214 as the thickness of removed cards between plate 214 and wheels 192 and 193 increases.

In operation, prior to each selection operation by the selector 26-1, the accumulator 19 is in its home position rightwardly of the selector 26-1 as best seen in FIG. 1, the accumulator 19 having been returned to its home position at the conclusion of the previous selected card removal operation following the previous card selection operation. Assuming the accumulator 19 is in its home position, a card selection operation is effected in the manner described in connection with FIGS. 2e-2f, with the result that the selected cards 23a are advanced in the forward Z direction relative to the undesired cards 23b of the cartridge located in the selector 26-1. With the desired cards 23a projecting from the cartridge and the magnet 29 in its lowered position (FIGS. 9 and 2f), the carriage motor 124 is energized to drive the carriage 82 leftwardly in the X direction (FIG. 3). Movement of the carriage leftwardly in the X direction continues at a relatively rapid rate until the card removal assembly 147 is proximate and rightward of the leading edge of the rightmost selected card, as determined by a card sensor to be described, whereupon the carriage drive motor 124 is switched to a much slower rate of speed. This insures that the rightmost selected card will be magnetically gripped by the magnet wheel 150 and the rightmost card advanced into the nip defined by rolls 148, 149 and 166, 167. When the rightmost card is advanced into the nip 148, 149 and 166, 167, a microswitch to be described is tripped, de-energizing the carriage traverse motor 124, stopping the traversing movement of the accumulator assembly 80. When the selected card is fully removed and its leading edge against stop 190, the motor 124 is re-energized at its high traverse rate until such time as magnet wheel 150 is proximate the next selected card in the path of the pickup assembly 147. When this occurs the carriage traverse motor 124 is again operated at its slow traverse rate by the card sensor until the leading edge of the card has been advanced by the magnet wheel 150 into the nip defined by wheels 148, 149 and 166, 167.

To sense when the magnetic wheel 150 is proximate a selected card in the course of carriage traversing movement in the leftward X direction, an optical sensing device 225 is provided on the righthand rear upper surface of the bottom plate 142. The optical sensor device includes a suitable light source 226 which directs a beam of light leftwardly in the X direction along the path of travel of the optical sensor 225 and a transducer 227 which is responsive to light from the source 225 which is reflected by a selected card extending into the path of the moving optical sensing device 225. Thus, as the carriage-mounted accumulator assembly 80 traverses leftwardly along the X axis, when the magnetic wheel 150 is proximate a selected card extending from the carriage at the selector 26-1, light from the source 226 reflected from the card incident on the transducer 227 reaches a level exceeding a predetermined threshold, causing a suitable electrical signal to be developed for reducing the speed at which the carriage motor 124 advances the carriage in the leftwardly X direction. As previously noted, this permits the magnetic wheel 150 to reliably magnetically grip the implanted chip 31 of the selected card and advance it into the nip defined by friction rolls 148, 149 and 166, 167.

To terminate energization of the carriage motor 124, after the carriage 82 has slowed down in response to sensing the proximity of a card with the optical sensor 225 and the leading edge of the card has advanced into the nip defined by friction rolls 148, 149 and 166, 167, a suitable microswitch 228 mounted to the bottom surface of the top plate 141 is provided. Cooperating with a movable microswitch actuator 228a is a card-operated trip plate 230 mounted for pivotal motion on the shaft 152 between the driven wheel 148 and the lower surface of the top plate 141. The trip plate 230 is normally spring-biased in a clockwise direction as viewed in FIG. 6 about its mounting shaft 152 by a suitable spring member (not shown). When the leading edge of a card enters the nip formed by friction wheels 148, 149 and 166, 167 under the action of the magnet wheel 150, the trip plate 230 pivots in a counterclockwise direction as viewed in FIG. 6, causing the rear edge 230b thereof to strike the microswitch actuator 228a of microswitch 228.

The microswitch 228 is a "normally closed" single pole, double throw switch which is in series circuit with the carriage motor 124. This allows the carriage motor to drive the accumulator assembly 80 when the trip plate 230 is in the position shown in FIG. 6, but to interrupt power to the carriage motor when the trip plate pivots clockwise as viewed in FIG. 6 in response to entry into the nip defined by rolls 148, 149 and 166, 167 of the leading edge of a selected card advanced by the magnet 150, thereby terminating energization of the motor 124 to stop the carriage and accumulator 19.

When the trailing edge of a selected card withdrawn by the assembly 147 advances forwardly sufficiently to have its trailing edge leave the nip defined by rolls 148, 149 and 166, 167, the trip plate 230 pivots clockwise as viewed in FIG. 6 to the position shown in FIG. 6. This deactuates the microswitch 228 allowing the motor 124 to be energized and the carriage to continue its traversing motion in the leftward X direction. If the next selected card to be withdrawn by the assembly 147 is not within the operative range of the optical sensor device 225, the deactuation of the microswitch 228 when the trailing edge of the last card passes forwardly of the nip defined by rolls 148, 149 and 166, 167, will result in movement of the carriage by the motor 124 at its high rate of speed until such time as the next closest selected card is sensed by the sensor 225 whereupon the speed will be reduced until the card trips the microswitch plate 230 which actuates switch 228 and stops the motor.

If, when the trailing edge of a selected card advances forwardly of the nip 148, 149 and 166, 167 to deactuate the microswitch 228, the next selected card to be withdrawn by the assembly 147 is within the range of the optical sensor device 225, the motor 124 will be energized, but only at its slow rate of speed. Such motor energization at the slow speed rate will continue until the leading edge of the next card has been advanced by the magnet wheel 150 into the nip defined by rolls 148, 149 and 166, 167 to trip the plate 230 and actuate the switch 228 whereupon the motor 124 is completely deenergized. When the trailing edge of the card advances forwardly of the trip plate 230, switch 228 is again deactuated and the process repeated.

If two or more selected cards are located adjacent each other the trip plate 230 remains in its tripped position, actuating microswitch 228 and de-energizing carriage motor 124 from the point in time when the leading edge of the rightmost card is advanced into the nip defined by rolls 148, 149 and 166, 167 until the point in time when the trailing edge of the last of the adjacent cards passes forwardly of the nip. Thus, where multiple selected cards are closely adjacent to each other, once the carriage stops traversing motion in response to tripping of plate 230 by the leading edge of the first card, the carriage remains stopped until the last of the several proximately located cards has advanced to a point where its trailing edge is forward of the trip plate 230. Only after this has occurred does the microswitch 228 become deactuated to permit the carriage motor 124 to again become energized to advance the carriage leftwardly at either its fast or slow rate depending upon whether the next selected card to be removed from the cartridge 16-1 at selector 26-1 is outside or inside the range of the optical sensor 225.

If a desired card is not physically present in a retrieved cartridge at the selector 26-1, the selection operation discussed in connection with FIGS. 2a-2f will not result in the advancement of a card in the forward Z direction from the cartridge into the path of the traversing card pickup assembly 147. Under such circumstances, it is unnecessary to cycle the movable accumulator assembly 80 through a traversing cycle from the home position, leftwardly in the X direction across the front of the selector 26-1 and then rightwardly in the X direction to return back to the home position. To avoid cycling the movable accumulator assembly 80 when the desired card has not been selected as a consequence of searching a retrieved tray at the selector 26-1, a second selected card sensor is provided which includes a source of light 234 and a light transducer 233 positioned at the selector 26-1 slightly forwardly of the leading edges of undesired, unselected cards in the cartridge at the selector (FIG. 1). With the light source 234 and light sensor 233 so positioned, if at least one card is not selected as the result of searching a retrieved cartridge at the selector 26-1, the light beam 235 from the source 234 reaches the transducer 233, providing a signal which inhibits cycling of the accumulator from its home position leftwardly in the X direction across the front of the selector and rightwardly back to return to its home position. Thus, if the desired card is not selected as a result of searching a retrieved cartridge at the selector 26-1, an unnecessary selector traversing operation by the movable accumulator assembly 80 does not result. Of course, if one or more cards are selected as the result of searching a retrieved cartridge at the selector 26-1, the light beam 235 from the light source 234 does not reach the transducer 233 and a signal to inhibit cycling of the movable accumulator assembly 80 is not produced.

As noted, if as a result of searching a retrieved cartridge 16-1 at the selector 26-1 one or more cards are selected to interrupt the beam 235 from the source 234, the carriage-mounted accumulator 19 starts traversing leftwardly along the X axis and, in a manner previously described, the selected cards are sequentially withdrawn from the cartridge 16-1 at selector 26-1 and advanced into the accumulator with their leading edges against the stop plate 190. Upon removal of the last, leftmost, selected card from the cartridge 16-1 at selector 26-1 by the accumulator 19, the light beam 235 from the light source 234 is no longer interrupted and once again reaches the light transducer 233. When this occurs an electric signal is produced, inhibiting further leftward scanning motion of the accumulator assembly 80 in the X direction, and returns the carriage-mounted accumulator assembly rightwardly along the X axis to the home position. Thus, unnecessary leftward travel of the carriage is avoided following removal of the last, leftwardmost selected card.

Upon return of the carriage-mounted accumulator 19 to the home position following leftward traversing motion across the front of the card selector 26-1 and removal of the selected cards from the cartridge thereat and transfer to the accumulator with their leading edges against stop 190, the accumulated cards abutting stop 190 are sequentially ejected from the assembly 80 forwardly in the Z direction to a container 84 via the slot 83 in the front housing of the mass document store 10. To facilitate ejection of the accumulated cards which have their leading edges against stop 190, a card ejecting mechanism 240 is provided as best shown in FIGS. 6, 8, and 10. The card ejecting mechanism includes a rotatable friction drive wheel 241 mounted to the lower end of a vertical motor shaft 242 by a hub 243 integral with the wheel 241. The shaft 242 is driven by a motor 244 which is mounted to a horizontal plate 245 fixed to the base plate 142 via a suitable bracket 247. When the motor 244 is energized the card-eject wheel 241 rotates in a counterclockwise direction as viewed in FIG. 10 about its motor mount shaft 242.

The motor shaft 242 which mounts the ejection wheel 241 is located to position the periphery of the ejection wheel leftwardly, as viewed in FIG. 8, of the left edge 190a of the card stop plate 190 by a distance greater than the width of a single card and less than the width of two cards. By so positioning the periphery of the ejection wheel 241 relative to the left edge (as viewed in FIG. 8) of the card stop 190, a card gate 239 is provided therebetween which permits only one card at a time located with its leading edge against card stop 190 to be ejected by the wheel 241.

As previously noted, at the conclusion of a carriage-traversing operation, selected cards which have been removed from the cartridge at the selector 26-1 by the pickup assembly 147 are held against the plate 214 by the spring-biased channel 195 and wheels 192, 193 with the leading edges of the cards against the rear (leftward as viewed in FIG. 10) surface of the card stop plate 190. When the accumulator assembly 80 has removed the last selected card and returned to its home position, the removed cards are ejected one by one through the gate 239 by the motor-driven ejection wheel 241. However, at this point the removed card closest to the periphery of ejection wheel 241 is still physically displaced from the periphery of the ejection wheel 241 by a distance depending upon the number of selected cards removed. To advance the removed cards toward the periphery of the ejection wheel 241 and thereby facilitate sequential ejection of the removed cards through the gate 239, it is necessary to move the leading edges of the removed cards which abut the card stop surface 190b rightwardly (upwardly as viewed in FIG. 10) in the direction of the X axis.

To accomplish the foregoing motion, a selectively slideable plate 246 is provided. The plate 246 is suitably mounted to the bottom plate 142 to permit sliding motion only in the X direction. A tension spring 246a having one end connected to a pin 248 extending upwardly from the righthand end of the plate 246 and the other end connected to a pin 249 extending downwardly from the motor mounting plate 245 (FIG. 8) is provided to normally bias the plate 246 rightwardly in the X direction. A stationary solenoid 250 mounted to the upper surface of the base plate 142 is provided. Solenoid 250 has an armature 251 connected via a spring 252 to an angle bracket 253 which is fastened to the plate 246 for selectively advancing the plate along the X axis in a rightwardly direction (upwardly as viewed in FIGS. 6 and 10) when the solenoid is energized.

Specifically, when the solenoid 250 is energized, the armature 251 moves rightwardly (upwardly as viewed in FIGS. 6 and 10), causing the angle bracket 253, and in turn the slide plate 246, to move rightwardly. The slide plate 246 is provided with a vertical throat 254 defined by vertical walls 254a and 254b which are angled toward each other in the forward Z direction. Walls 254a and 254b extend vertically upwardly from the slide plate 246. When the slide plate 246 is in its normal leftward position shown in FIGS. 6 and 10, selected cards which have been removed by the assembly 147 and advanced forwardly such that their leading edges abut the stop plate surface 190b are positioned with the leading portion of the cards between the throat walls 254a and 254b of the throat 254. With the leading portions of the removed card so positioned between walls 254a and 254b, when the plate 246 is urged rightwardly by energization of solenoid 250, the rightmost card is urged against the periphery of the ejection wheel 241 and the cards are ejected sequentially in the forward Z direction through the card gate 239 into the container 84 via slot 83 in the mass document storage housing 11. When the leftmost removed card which is closest to the side plate 214 has been ejected by the driven roll 241 through the gate 239 into the container 84, the solenoid 250 is de-energized and the slide plate 246 returns under the action of spring 246a to its normal position shown in FIGS. 6 and 10.

As is apparent from FIG. 8, the throat wall 254a is substantially lower than the throat wall 254b. This permits throat wall 254a to pass beneath the lower horizontal surface of the eject wheel 241 when the solenoid 250 is energized and moves rightwardly in the X direction to advance the removed cards with their leading edges abutting stop plate surface 190a into contact with the periphery of the ejection wheel 241.

With reference to FIGS. 10 and 12-15, the card removal and ejection sequence can be more readily understood. As shown in FIG. 10, the accumulator assembly 147 is proximate the first card A of three grouped cards A, B, and C. In a manner described previously, the magnetic wheel 150 advances the rightmost card A into the nip formed by wheels 148, 149 and 166, 167. The friction wheels 148 and 149 then drive the card A in contact therewith forwardly in the Z direction to a point where the leading edge thereof is engaged by the driven friction rolls 192, 193 (FIG. 12). At this point the trailing portion of the card A is still engaged by the friction wheels 148, 149. As the friction wheels 148, 149 and 192, 193 continue to be driven, card A advances further until its trailing edge is deflected by deflector 220 leftwardly of the leading edge of the second card B to a point where the trailing portion of card A is against the side plate 214 (FIG. 13). Since friction wheels 192, 193 have a greater peripheral speed than friction wheels 148, 149, movement of the trailing portion of card A leftwardly of the leading edge of card B against plate 214 is assured.

When the trailing edge of card A passes forwardly of the nip defined by rolls 148, 149 and 166, 167, the leading edge of the second card B comes into contact with the driven friction wheels 148, 149 to advance this card forwardly (FIG. 13). Card B is then advanced, first by friction rolls 148, 149, and thereafter by friction rolls 192, 193, to its forward position with the leading edge thereof against the stop plate surface 190b (FIG. 14).

The foregoing process continues, with the accumulator assembly 80 stationary, until the leading edge of the last card C of the group is advanced with its leading edge against the stop plate surface 190b. The carriage then advances leftwardly in the X direction to position the card pickup assembly 147 proximate the next card D and this card is removed in a manner described previously. When all selected cards have been removed and accumulated between the plate 214 and the rolls 192, 193 with their leading edges against stop plate surface 190b, as shown in FIG. 14, the carriage-mounted accumulator returns to its home position. Upon reaching the home position whereat the card gate 239 is aligned with slot 83, the solenoid 250 is energized urging plate 246 rightwardly in the X direction to bring the cards against the periphery of ejection wheel 241. The removed cards are then ejected on a sequential basis by the wheel 241 through the card gate 239 into the container 84 via slot 83 in the mass document storage housing 11.

With the removed cards now in the container 84, the accumulator assembly 80 is ready for another selected card removing cycle which may be in association with the same cartridge 61-1 at the selector 26-1 or another and different cartridge. While it is preferable to eject the removed cards at the conclusion of a cartridge traversing operation when the accumulator assembly 80 has returned to its home position and prior to beginning a new traversing operation for removing selected cards from another cartridge, this is not necessary. For example, and assuming that the throat 254 is designed to accommodate 100 removed cards, the accumulator assembly 80 could be cycled with respect to plural cartridges, each having selected cards which are removed, until the capacity of the throat 254 is reached, whereupon the accumulator assembly 80 returns to the home position and the accumulated cards therein are ejected into the container 84.

Significantly, the selected cards which are removed by the traversing accumulator assembly 80 are ejected via the slot 83 into the container 84 on a sequential basis in the same order in which they were removed from the cartridge(s). If the order of ejection of the cards into the container 84 is preserved, when the retrieved cards are ultimately removed from the container 84, they will be stacked in the same order as they were removed from their respective cartridge(s).

If buffer selectors 26-2 and 26-3 are searched simultaneously with the searching of selector 26-1, desired cards residing in trays 16-2 and 16-3 at selectors 26-2 and 26-3 should be removed as they are selected. This removal can be performed manually. After the desired cards selected at selector 26-1 and ejected into the container 84 are removed therefrom and suitably processed, the cards are returned to random locations in the buffer 26-2. At some convenient point in time the cards in the buffers 26-2 and 26-3 are returned to the mass document store in accordance with the disclosure of U.S. Pat. No. 3,786,916. If desired, before processing selected cards ejected into the container 84, the cards may be temporarily stored in various compartments 16-3a, 16-3b, . . . 16-3d of the cartridge 16-3 assigned to different functions for subsequent processing and thereafter return on a random basis to the selector 26-2.

Operatively associated with the platen 28 and forming a part of the document selector 26-1 is a transversely disposed longitudinal electromagnet 29 having a length at least equal to the length of a cartridge measured in the X direction. As explained previously in connection with FIGS. 2a–2f, the electromagnet 29, when energized, functions to apply a force in the forward Z direction to all cards in contact therewith during the card selection operation, the force being applied to the cards via the ferromagnetic chips 31 implanted therein.

The elongated magnet 29 is mounted for movement on an elongated horizontal mounting bar 260, as best shown in FIGS. 9 and 11. Depending from the magnet mounting bar 260 at opposite ends thereof are a pair of vertical guide members 261 and 262. Extending rearwardly from each of the vertical guide members 261 and 262 are horizontal cam members 263 and 264, respectively. Each of the horizontal cam members 263 and 264 has on its lower side a downwardly and forwardly sloping cam edge 265.

Also associated with the longitudinal magnet 29 is a horizontally movable drawer 33. The drawer 33 includes a vertically disposed front panel 33a which terminates at its opposite ends in vertical surfaces 33b and 33c. Intermediate the ends 33b, 33c the drawer has a pair of vertical guide slots 33d and 33e. Guide members 261 and 262 which depend from the magnet support member 260 reciprocate vertically in guide slots 33d and 33e, respectively, thereby limiting movement of the magnet support member 260, and hence the magnet 29, relative to the drawer 33 to the vertical direction. Extending rearwardly from the ends 33b, 33c of the drawer panel 33 are a pair of horizontal bars 33f and 33g. The frame (not shown) of the selector 26 is provided with suitable horizontal guide slots (not shown) for slideably receiving the members 33f and 33g to restrict movement thereof relative to the platen 28 to a horizontal direction parallel to the Z axis.

In operation, horizontal motion is imparted to the magnet 29 to effect the card selection operation shown in FIGS. 2a–2f by a roller 267 eccentrically mounted for rotation about an axis 268. This roller 267 engages an arm 269 fixed to the drawer 33. The elliptical orbital path of the roller reciprocates the drawer 33.

A vertical motion is imparted to the magnet 29, as the drawer is horizontally reciprocated, by the engagement and disengagement of the cam surfaces 265 with a shaft 272. Thus, during that portion of the travel of the drawer 33 when cam edges 265 engage shaft 272, the magnet has both horizontal and vertical components of motion imparted to it.

As is apparent from the discussion of the selection operation in FIGS. 2a–2f, combined horizontal and vertical motion is imparted to the magnet 29 when the drawer 33 moves from the position shown in FIG. 2e to the position shown in FIG. 2f upon completion of the card selection operation. As the drawer 33 is driven from the position shown in FIG. 2e to the position shown in FIG. 2f, the magnet 29 drops below the level of the bottom plate 142 of the carriage-mounted accumulator prior to its traverse across the front of the selector to remove selected cards. In this way, mechanical interference is avoided between the magnet 29 and the traversing accumulator assembly 80. At the conclusion of the selected card removal operation after the accumulator assembly has returned to its home position rightwardly of the selector 26, the drawer 33 can be returned to its normal elevated position shown in FIGS.

2a–2e wherein the magnet 29 is located in the same horizontal plane as the chips 31 of cards located at the selector.

To avoid dragging selected cards downwardly and forwardly with the magnet 29 when the magnet moves from the position shown in FIG. 2e to the position shown in FIG. 2f, the polarization of the magnet is reversed at the conclusion of the step shown in FIG. 2e. The reversal of polarity of the magnet at this point in the operation of the selector effectively terminates the magnetic attraction force applied by the magnet 29 to the chips 31 of the selected cards; in fact, reversal of polarity of the magnet effectively repels the chips of the selected cards with respect to the magnet, thereby insuring termination of the application of magnetic force to the chips of the selected cards in the forward Z direction.

Automatic control of the energization and polarity of the electromagnet and of the motors and solenoids which operate the various moving parts of the apparatus of this invention can be effected utilizing a suitably programmed microcomputer responsive to a keyboard input identifying a particular card to be retrieved and suitably positioned limit switches which provide signals reflecting the location of the various movable members. Alternatively, the apparatus of this invention can be under semiautomatic control from a keyboard having individual keys for controlling the energization states of the various motors and solenoids which impart motion to the moving parts of the apparatus.

We claim:

1. Apparatus for selecting, removing and storing at least one desired document selected from among a plurality of undesired documents, comprising:
    a plurality of generally planar documents each having opposite faces, each said document encoded along at least one sorting edge to facilitate distinguishing said documents from each other, said documents each having a leading edge disposed transversely to said at least one sorting edge, said documents each also having a trailing edge opposite said leading edge and a length measured between said leading and trailing edges,
    a document selector in which said coded documents are randomly positionable in a deck in registry in face-to-face relation at a sort position with their respective sorting and leading edges aligned, said leading and sorting edges of said aligned and registered documents when in said sort position in said deck collectively defining leading edge and sorting edge planes, respectively, said document selector including sorting elements proximate said sorting edge plane and cooperable with said document sorting edges to select at least one desired document from said plurality of documents in said deck and advance it forwardly relative to said deck in a direction parallel to its sorting edge to a selected document position whereat its leading edge is displaced forwardly of said leading edge plane a preset distance less than said length of said document, said leading edge of said selected document lying in a selected document leading edge plane disposed parallel to said leading edge plane and forwardly thereof by a distance equal to said preset distance,
    selected document removal and storage means mounted for movement along a traversing path in a direction parallel to said leading edge plane, said selected document removal and storage means having a temporary document storage zone therein, said selected document removal and storage means further having a document removal assembly thereon engageable with a selected desired document located at said selected document position for fully removing said at least one selected desired document engaged therewith from said deck and transferring it to said temporary storage zone, and
    drive means for moving said selected document removal means along said traversing path.

2. The apparatus of claim 1 wherein said drive means is operative to selectively drive said selected document removal and storage means at fast and slow rates, said apparatus further including:
    selected card proximity sensing means mounted on said selected card removal and storage means for sensing proximity of said selected document removal assembly to a selected document in said selected document position, and
    control means responsive to said selected document proximity sensing means for changing the speed of said drive means from fast to slow when, in the course of moving said selected document removal and storage means along said traversing path, said selected document removal assembly approaches proximate said selected document to facilitate engagement thereof by said document removal assembly and transfer thereof from said deck to said temporary storage zone.

3. The apparatus of claim 2 further including detector means for detecting engagement of a selected document by said document removal assembly, said control means being responsive to said detecting means for stopping movement of said selected document removal and storage means along said traversing path when said document removal assembly engages a selected document.

4. The apparatus of claim 1 wherein said control means is operative to return said selected document removal and storage means to a home position remote from said deck following removal of all selected documents from said deck and transfer thereof to said temporary storage zone.

5. The apparatus of claim 4 further including means for sensing the presence of a selected document in said selected document position, said control means responsive to said sensing means for returning said selected document removal and storage means to said home position without further movement thereof along said traversing path in a direction away from said home position after removal of the last selected document from said deck and transfer thereof to said temporary storage zone.

6. The apparatus of claim 4 or claim 5 further including:
    document accumulating means, and
    document ejection means associated with said selected document removal and storage means for ejecting documents in said temporary storage zone into said document accumulating means when said selected document removal and storage means is positioned at said home position.

7. The apparatus of claim 6 wherein said accumulating means includes a stationary document container, which is located in document-receiving relation to said ejecting means when said selected document removal and storage means is in said home position, said ejecting means ejecting documents from said temporary storage zone into said container for accumulation therein when said selected document removal and storage means is in said home position.

8. The apparatus of claim 1 wherein each said document includes a ferromagnetic chip in the leading edge thereof, and wherein said document selector includes a transverse magnet disposed common to said ferromagnetic chips of all documents in said deck for applying a force to said selected documents for advancement thereof to said selected document position, and wherein said selected document removal assembly includes a movable magnet positioned to magnetically engage the ferromagnetic chips of selected documents in said selected document position as said selected document removal and storage means moves along said traversing path and advance documents so engaged toward said temporary storage zone.

9. The apparatus of claim 8 wherein said movable magnet is mounted to said selected document removal and storage means for rotation about an axis generally parallel to the leading edge of a selected document, and wherein said selected document removal assembly further includes means for rotating said magnet about said axis to advance a document whose chip is engaged therewith toward said temporary storage zone.

10. The apparatus of claim 8 wherein said document selector further includes magnet reciprocating means for reciprocating said transverse magnet between an inner position proximate said leading edge plane in alignment with said chips, and an outer position disposed below said sorting edge plane and outwardly of said selected document leading edge plane to facilitate advancement of selected documents to said selected document position and movement of said selected document removal and storage means in said traversing path without mechanically interfering with said transverse magnet.

11. The apparatus of claim 8 wherein said selected document removal assembly includes a first friction drive means mounted proximate said movable magnet for feeding a selected document, which is initially advanced by said movable magnet from said selected document position, toward said temporary storage zone a distance equal to substantially the entire length of said document.

12. The apparatus of claim 11 wherein said selected document removal assembly further includes a second friction drive means spaced outwardly from said first friction drive means a distance less than said length of said document, said second friction drive means having a document advancing speed greater than that of said first friction drive means for advancing the trailing edge of a first selected document driven by said second friction drive means clear of the leading edge of a second selected document driven by said first friction drive means.

13. The apparatus of claim 12 wherein said selected document removal and storage means further includes a deflector located between said first and second friction drive means for deflecting the trailing edge of a document engaged by said second friction drive means and disengaged by said first drive means in the same direction along said traversing path as said selected document removal and storage means moves in the course of transferring selected documents from said deck to said temporary storage zone.

14. The apparatus of claim 6 wherein said selected document removal and storage means includes:

a first document stop for registering the leading edges of documents in said storage zone in a fixed plane relative thereto parallel to said selected document leading edge plane, a second document stop against which the faces of documents in said storage zone are located in disengaged relation from said ejecting means, and document shifting means for shifting documents in said storage zone into ejecting relation to said ejecting means when said selected document removal and storage means is in said home position for ejecting said documents from said storage zone into said container.

15. The apparatus of claim 12 wherein said selected document removal and storage means includes:

a first document stop for registering the leading edges of documents in said storage zone in a fixed plane relative thereto parallel to said selected document leading edge plane, a second document stop against which the faces of documents in said storage zone are located in disengaged relation from said ejecting means, document ejecting means for ejecting documents engaged therewith from said temporary storage zone, and document shifting means for shifting documents in said storage zone into ejecting relation to said ejecting means.

16. Document retrieval apparatus comprising:

a plurality of cartridges each randomly storing documents encoded along at least one sorting edge to facilitate distinguishing said documents of a deck from each other, said documents each having a leading edge disposed transversely to said at least one sorting edge, said documents each also having a trailing edge opposite said leading edge and a length measured between said leading and trailing edges, a plurality of addressable crypts normally storing different ones of said cartridges, a first document selector in which coded documents of a retrieved cartridge are randomly positionable in a deck in registry in face-to-face relation at a sort position with their respective sorting and leading edges aligned, said leading and sorting edges of said aligned and registered documents when in said sort position in said deck collectively defining leading edge and sorting edge planes, respectively, said document selector including sorting elements proximate said sorting edge plane and cooperable with said document sorting edges to select at least one desired document from said plurality of documents in said deck and advance it forwardly relative to said deck in a direction parallel to its sorting edge to a selected document position whereat its leading edge is displaced forwardly of said leading edge plane a preset distance less than said length of said document, said leading edge of said selected document lying in a selected document leading edge plane disposed parallel to said leading edge plane and forwardly thereof by a distance equal to said preset distance, a cartridge retriever for transferring cartridges between said first selector and a selected crypt, selected document removal and storage means mounted for movement along a traversing path in a direction parallel to said leading edge plane, said selected document removal and storage means having a temporary document storage zone therein, said selected document removal and storage means further having a document removal assembly thereon engageable with a selected desired document located at said selected document position for fully removing said at least one selected desired document engaged therewith from said deck and transferring it to said temporary storage zone, drive means for moving said selected document removal means along said traversing path, a buffer deck of generally planar documents each having opposite faces, each said document in said buffer deck encoded along at least one sorting edge to facilitate distinguishing said documents from each other, said documents in said buffer deck each having a leading edge disposed transversely to said at least one sorting edge, said documents in said buffer deck each also having a trailing edge and a length measured between said leading and trailing edges, a buffer document selector in which said coded documents of said buffer deck are randomly positionable in registry in face-to-face relation at a sort position with their respective sorting and leading edges aligned, said leading and sorting edges of said aligned and registered documents of said buffer deck when in said sort position in said buffer deck collectively defining leading edge and sorting edge planes, respectively, said buffer document selector including sorting elements proximate said sorting edge plane of said buffer deck and cooperable with said document sorting edges of said buffer deck to select at least one desired document from said plurality of documents in said buffer deck and advance it forwardly relative to said buffer deck in a direction parallel to its sorting edge to a selected document position whereat its leading edge is displaced forwardly of said leading edge plane of said buffer deck, and control means for operating said buffer document selector and first document selector substantially simultaneously to search substantially simultaneously both said buffer deck and retrieved deck for a desired card.

17. The apparatus of claim 1 wherein said document removal assembly includes:

a movable document-engaging means positioned to engage selected documents in said selected document position as said selected document removal and storage means moves along said traversing path and initiate advancement of said engaged documents toward said temporary storage zone, and a first friction drive means mounted proximate said movable document-engaging means for feeding a selected document, which is initially advanced from said selected document position by said movable document-engaging means, toward said temporary storage zone a distance equal to substantially the entire length of said document.

18. The apparatus of claim 17 wherein said selected document removal assembly further includes a second friction drive means spaced outwardly from said first friction drive means a distance less than said length of said document, said second friction drive means having a document advancing speed greater than that of said first friction drive means for advancing the trailing edge of a first selected document driven by said second friction drive means clear of the leading edge of a second selected document driven by said first friction drive means.

19. The apparatus of claim 18 wherein said selected document removal and storage means further includes a deflector located between said first and second friction drive means for deflecting the trailing edge of a document engaged by said second friction drive means and disengaged by said first drive means in the same direction along said traversing path as said selected document removal and storage means moves in the course of transferring selected documents from said deck to said temporary storage zone.

20. The apparatus of claim 19 further including:
document accumulating means, and
document ejection means associated with said selected document removal and storage means for ejecting documents in said temporary storage zone into said document accumulating means.

21. The apparatus of claim 20 wherein said selected document removal and storage means includes:

a first document stop for registering the leading edges of documents in said storage zone in a fixed plane relative thereto parallel to said selected document leading edge plane, a second document stop against which the faces of documents in said storage zone are located in disengaged relation from said ejecting means, and document shifting means for shifting documents in said storage zone into ejecting relation to said ejecting means for ejecting said documents from said storage zone into said accumulating means.

22. The apparatus of claim 21 wherein said second friction drive means is mounted for movement along a path generally perpendicular to the direction of feed of said documents by said second friction drive means, and wherein said document removal assembly includes means for biasing said second friction drive means toward said second document stop to enable said second friction drive means to feed a given selected document against said first document stop while simultaneously urging said given document and a variable number of previously fed documents against said second document stop.

23. The apparatus of claim 13 wherein said second friction drive means is mounted for movement along a path generally perpendicular to the direction of feed of said documents by said second friction drive means, and wherein said document removal assembly includes means for biasing said second friction drive means toward said second document stop to enable said second friction drive means to feed a given selected document against said first document stop while simultaneously urging said given document and a variable number of previously fed documents against said second document stop.

* * * * *